(12) United States Patent
Koishi et al.

(10) Patent No.: US 7,264,852 B2
(45) Date of Patent: Sep. 4, 2007

(54) LIQUID CRYSTAL PANEL AND LIQUID CRYSTAL DISPLAY APPARATUS

(75) Inventors: Naoki Koishi, Osaka (JP); Shuuji Yano, Osaka (JP); Kenji Yoda, Osaka (JP); Masaki Hayashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 161 days.

(21) Appl. No.: 11/252,736

(22) Filed: Oct. 19, 2005

(65) Prior Publication Data

US 2006/0246231 A1 Nov. 2, 2006

(30) Foreign Application Priority Data

Oct. 22, 2004 (JP) ............... 2004-307563
May 10, 2005 (JP) ............... 2005-137046

(51) Int. Cl.
*G02F 1/3363* (2006.01)
(52) U.S. Cl. ............. 428/1.3; 428/1.1; 349/118; 359/499
(58) Field of Classification Search ........... 428/1.1, 428/1.3; 349/117–122; 359/499
See application file for complete search history.

(56) References Cited

U.S. PATENT DOCUMENTS

| | | | | |
|---|---|---|---|---|
| 5,245,456 A | * | 9/1993 | Yoshimi et al. | 349/118 |
| 5,559,618 A | * | 9/1996 | Mori | 349/117 |
| 6,330,108 B1 | * | 12/2001 | Nishikouji et al. | 359/499 |
| 2003/0210370 A1 | | 11/2003 | Yano et al. | |
| 2005/0062917 A1 | | 3/2005 | Kashima | |

FOREIGN PATENT DOCUMENTS

| | | |
|---|---|---|
| JP | 4-305602 | 10/1992 |
| JP | 5-157911 | 6/1993 |
| JP | 11-305217 | 11/1999 |
| JP | 2001-316494 A | 11/2001 |
| JP | 2001-318224 A | 11/2001 |
| JP | 2004-4641 | 1/2004 |
| JP | 2004-4642 | 1/2004 |
| JP | 2004-326089 A1 | 11/2004 |

OTHER PUBLICATIONS

English Abstract of Publication JP 06-167612, Yoji Ito, Jun. 1994.*

* cited by examiner

*Primary Examiner*—Terrel Morris
*Assistant Examiner*—Sow-Fun Hon
(74) *Attorney, Agent, or Firm*—Westerman, Hattori, Daniels & Adrian, LLP.

(57) ABSTRACT

A liquid crystal panel having improved contrast ratio in an oblique direction and good display evenness without causing shift or unevenness in retardation values due to shrinkage stress of a polarizer or heat of backlight is provided.

A liquid crystal panel according to an embodiment of the present invention includes: a liquid crystal cell; a polarizer arranged on both sides of the liquid crystal cell; a first optical element arranged between one polarizer and the liquid crystal cell; and a second optical element arranged between the other polarizer and the liquid crystal cell, wherein: the first optical element comprises a retardation film containing a styrene-based resin and a polycarbonate-based resin and satisfying the following expressions (1) and (2); and the second optical element has substantially optical isotropy:

$$240 \text{ nm} \leq Re[590] \leq 350 \text{ nm} \quad (1)$$

$$0.20 \leq Rth[590]/Re[590] \leq 0.80. \quad (2)$$

11 Claims, 8 Drawing Sheets
(2 of 8 Drawing Sheet(s) Filed in Color)

LIQUID CRYSTAL PANEL AND LIQUID CRYSTAL DISPLAY APPARATUS

BACKGROUND OF THE INVENTION

1. Field of the Invention

The present invention relates to a liquid crystal panel having a liquid crystal cell, a polarizer, and an optical element. Further, the present invention relates to a liquid crystal television and a liquid crystal display apparatus each using the liquid crystal panel.

2. Description of the Related Art

A liquid crystal display apparatus provided with a liquid crystal cell of in-plane switching (IPS) mode involves control of light transmittance (white display) and light shielding (black display) through application of an electric field in a horizontal direction on liquid crystal molecules aligned in a substantially horizontal direction without application of the electric field to rotate the liquid crystal molecules by about 45°. A conventional liquid crystal display apparatus provided with a liquid crystal cell of IPS mode has a problem in that a contrast ratio of a screen viewed from an oblique direction at an angle of 45° (azimuth angle of 45°, 135°, 225°, or 315°) with respect to an absorption axis of a polarizer degrades.

There is disclosed a technique for solving the problem involving use of a λ/2 plate exhibiting a refractive index profile of nx>nz>ny (wherein, nx, ny, and nz respectively represent refractive indices in a slow axis direction, fast axis direction, and thickness direction of a film) for improving display properties in an oblique direction (JP 11-305217 A, for example). However, the disclosed technique provides insufficient improvement in contrast ratio in an oblique direction and color shift in an oblique direction, and further improvement in display properties is desired.

An aromatic polymer film such as a polycarbonate-based resin, a polyarylate-based resin, or a polyester-based resin had been heretofore used as the λ/2 plate exhibiting a refractive index profile of nx>nz>ny (JP 04-305602 A or JP 05-157911 A, for example). However, the aromatic polymer film has a large photoelastic coefficient and its retardation values may vary easily by stress. Thus, the aromatic polymer film has a problem in that display evenness degrades as described below. In a case where the aromatic polymer film attached between a liquid crystal cell and a polarizer is exposed to high temperatures, retardation values may depart from designed values due to shrinkage stress of the polarizer. Further, uneven stress generated by heat of backlight may cause unevenness in retardation values.

Meanwhile, an aliphatic resin film such as a norbornene-based resin film has a small photoelastic coefficient. However, the aliphatic resin film hardly causes retardation, and desired retardation values cannot be obtained through stretching at a low stretch ratio as in the aromatic polymer film, or even at a high stretch ratio. The stretching at a high stretch ratio causes a problem of breaking of the film. Recently, further improvement in display evenness of a liquid crystal panel has been desired with increasing screen size and brighter backlight. However, the conventional technique as described above cannot provide a liquid crystal panel sufficiently satisfying the requirements.

SUMMARY OF THE INVENTION

The present invention has been made in view of solving the above problems, and an object of the present invention is to provide a liquid crystal panel having a liquid crystal cell with improved contrast ratio in an oblique direction. Another object of the present invention is to provide a liquid crystal panel and a liquid crystal display apparatus each having a liquid crystal cell with good display evenness without causing shift or unevenness in retardation values due to shrinkage stress of a polarizer or heat of backlight.

The inventors of the present invention have conducted intensive studies for solving the above problems, and have found that the above objects can be attained with the liquid crystal panel and liquid crystal display apparatus described below, to thereby complete the present invention.

A liquid crystal panel according to an embodiment of the invention includes: a liquid crystal cell; a polarizer arranged on both sides of the liquid crystal cell; a first optical element arranged between one polarizer and the liquid crystal cell; and a second optical element arranged between the other polarizer and the liquid crystal cell, wherein: the first optical element comprises a retardation film containing a styrene-based resin and a polycarbonate-based resin and satisfying the following expressions (1) and (2); and the second optical element has substantially optical isotropy:

$$240 \text{ nm} \leq Re[590] \leq 350 \text{ nm} \tag{1}$$

$$0.20 \leq Rth[590]/Re[590] \leq 0.80 \tag{2}$$

In one embodiment of the invention, the first optical element has a slow axis which is one of substantially parallel and substantially perpendicular to an absorption axis of one polarizer.

In another embodiment of the invention, the liquid crystal cell includes a liquid crystal layer containing homogeneously aligned nematic liquid crystals in the absence of an electric field.

In still another embodiment of the invention, the liquid crystal layer has a refractive index profile of nx>ny=nz.

In still another embodiment of the invention, the liquid crystal cell includes one of IPS mode and FFS mode.

In still another embodiment of the invention, an initial alignment direction of the liquid crystal cell is substantially parallel to a direction of an absorption axis of the polarizer on a side where the second optical element is arranged.

In still another embodiment of the invention, the initial alignment direction of the liquid crystal cell is substantially parallel to a direction of an absorption axis of the polarizer arranged on a backlight side of the liquid crystal cell.

In still another embodiment of the invention, the initial alignment direction of the liquid crystal cell is substantially perpendicular to a direction of an absorption axis of the polarizer arranged on a backlight side of the liquid crystal cell.

In still another embodiment of the invention, the first optical element has wavelength dispersion property of 0.81 to 1.10.

In still another embodiment of the invention, the first optical element includes a single retardation film containing a styrene-based resin and a polycarbonate-based resin.

In still another embodiment of the invention, the first optical element includes a laminate including the retardation film containing a styrene-based resin and a polycarbonate-based resin.

In still another embodiment of the invention, a content of the styrene-based resin in the retardation film is 10 to 40 parts by weight with respect to 100 parts by weight of a total solid content.

In still another embodiment of the invention, the polycarbonate-based resin of the retardation film contains repeating units represented by the formulae (5) and (6).

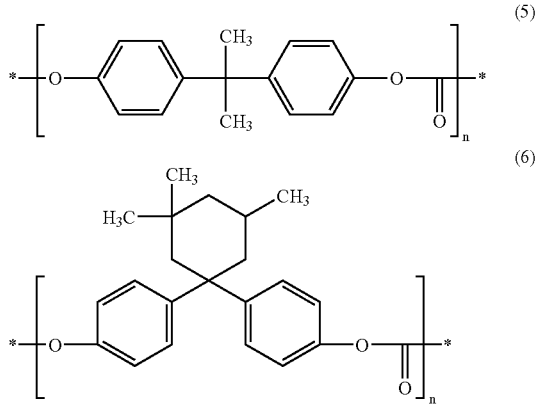

In still another embodiment of the invention, the retardation film has an absolute value of photoelastic coefficient measured by using light of a wavelength of 590 nm at 23° C. of $2.0 \times 10^{-11}$ to $8.0 \times 10^{-11}$ m²/N.

In still another embodiment of the invention, the second optical element satisfies the following expressions (3) and (4):

$$0 \text{ nm} \leq Re[590] \leq 10 \text{ nm} \tag{3}$$

$$0 \text{ nm} \leq Rth[590] \leq 20 \text{ nm} \tag{4}$$

In still another embodiment of the invention, the second optical element includes at least one polymer film selected from the group consisting of a cellulose-based resin, a norbornene-based resin, and a resin containing an alternating copolymer of isobutylene and N-methylmaleimide and an acrylonitrile/styrene copolymer.

In still another embodiment of the invention, the second optical element includes a laminate film prepared by laminating a negative C plate satisfying the following expressions (7) and (8), and a positive C plate satisfying the following expressions (9) and (10):

$$0 \text{ nm} < Re[590] \leq 10 \text{ nm} \tag{7}$$

$$20 \text{ nm} < Rth[590] \leq 400 \text{ nm} \tag{8}$$

$$0 \text{ nm} < Re[590] \leq 10 \text{ nm} \tag{9}$$

$$-400 \text{ nm} \leq Rth[590] < -20 \text{ nm} \tag{10}$$

In still another embodiment of the invention, the liquid crystal panel further includes a protective film on an outer side of each polarizer.

According to another aspect of the invention, a liquid crystal television is provided. The liquid crystal television includes the above-described liquid crystal panel.

According to still another aspect of the invention, a liquid crystal display apparatus is provided. The liquid crystal display apparatus includes the above-described liquid crystal panel.

The liquid crystal panel of the present invention is provided with: the first optical element satisfying the below-indicated expressions (1) and (2) arranged between one polarizer and the liquid crystal cell; and the second optical element having substantially optical isotropy arranged between the other polarizer and the liquid crystal cell, to thereby enhance a contrast ratio of the liquid crystal display apparatus in an oblique direction. The first optical element of the present invention including the retardation film containing a styrene-based resin and a polycarbonate-based resin has a small photoelastic coefficient, to thereby prevent unevenness in retardation values due to shrinkage stress of the polarizer or heat of backlight of the liquid crystal panel. No retardation film having a small photoelastic coefficient and having a relationship of nx>nz>ny has been hitherto obtained. However, in the present invention, a shrinkable film having a predetermined shrinkage ratio is attached to one side or both sides of a polymer film containing a styrene-based resin and a polycarbonate-based resin and the resultant is heat stretched, to thereby provide a retardation film having a small photoelastic coefficient and a relationship of nx>nz>ny and satisfying the below-indicated expressions (1) and (2). As a result, good display properties of the liquid crystal display apparatus can be maintained for a long period of time.

$$240 \text{ nm} \leq Re[590] \leq 350 \text{ nm} \tag{1}$$

$$0.20 \leq Rth[590]/Re[590] \leq 0.80 \tag{2}$$

(In the expressions (1) and (2), Re[590] and Rth[590] respectively represent in-plane retardation and thickness direction retardation values of the film measured by using light of a wavelength of 590 nm at 23° C.)

BRIEF DESCRIPTION OF THE DRAWINGS

The patent or application file contains at least one drawing executed in color. Copies of this patent or patent application publication with color drawing(s) will be provide by the Office upon request and payment of the necessary fee.

In the accompanying drawings.

DESCRIPTION OF THE PREFERRED EMBODIMENTS

A. Outline of Entire Liquid Crystal Panel

Figure 1:
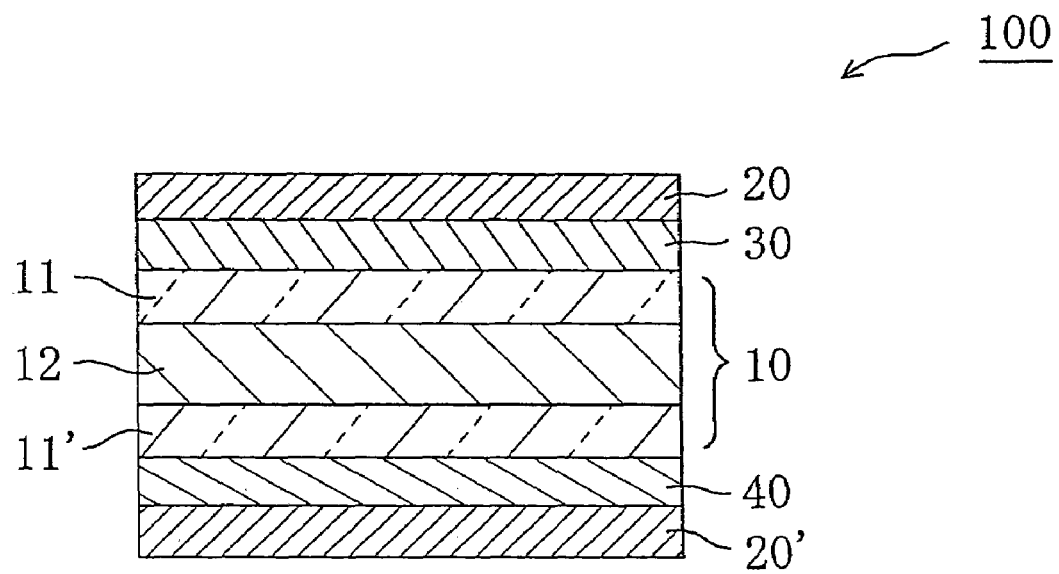
FIG. 1 is a schematic sectional view of a liquid crystal panel according to a preferred embodiment of the present invention.
Figure 2A:
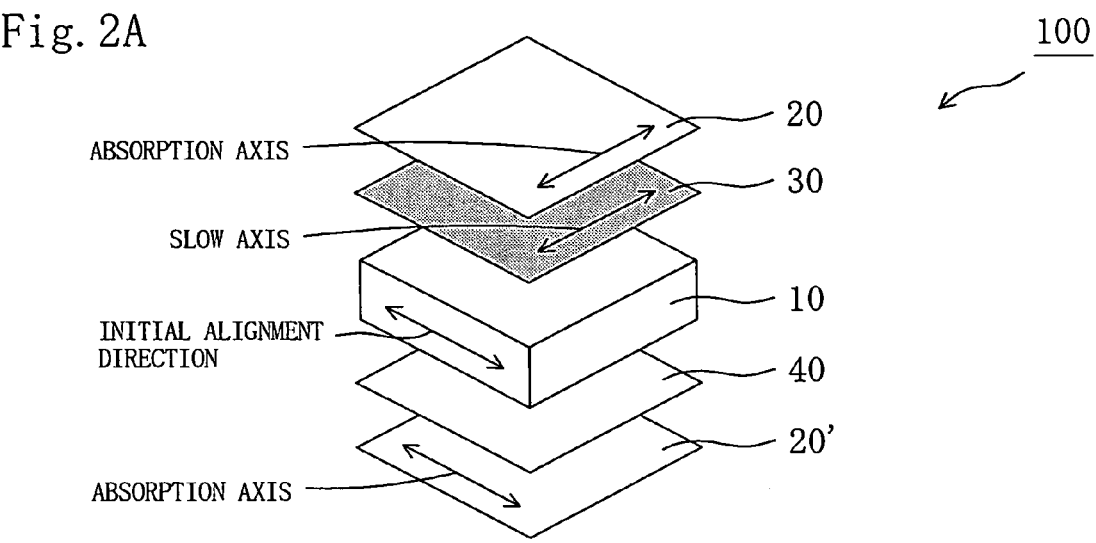
FIG. 2A is a schematic perspective view of the liquid crystal panel of FIG. 1.
Figure 2B:
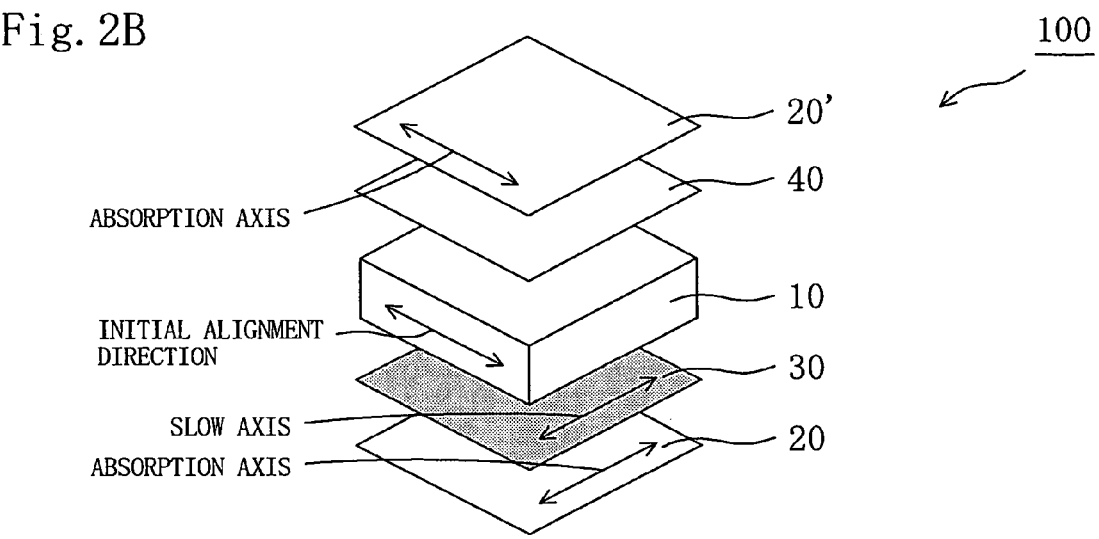
FIG. 2B is a schematic perspective view of a liquid crystal panel according to another preferred embodiment of the present invention.

FIG. 1 is a schematic sectional view of a liquid crystal panel according to a preferred embodiment of the present invention. FIG. 2A is a schematic perspective view of a liquid crystal panel of O-mode, and FIG. 2B is a schematic perspective view of a liquid crystal panel of E-mode. Note that, ratios among length, width, and thickness of each member in FIGS. 1, 2A, and 2B are different from those of an actual member for clarity. A liquid crystal panel 100 is provided with: a liquid crystal cell 10; polarizers 20 and 20' arranged on both sides of the liquid crystal cell 10; a first optical element 30 arranged between one polarizer (polarizer 20 in FIGS. 1, 2A, and 2B) and the liquid crystal cell 10; and a second optical element 40 arranged between the other polarizer (polarizer 20' in FIGS. 1, 2A, and 2B) and the liquid crystal cell 10. For practical use, any appropriate protective films (not shown) may be arranged on outer sides of the polarizers 20 and 20'. FIGS. 1, 2A, and 2B each show a case where a slow axis of the first optical element 30 and an absorption axis of the polarizer 20 are parallel to each other, and a slow axis of the second optical element 40 (when detected) and an absorption axis of the polarizer 20' are parallel to each other. However, the slow axis of the first optical element 30 and the absorption axis of the polarizer 20 may be perpendicular to each other, and the slow axis of the second optical element 40 (when detected) and the absorption axis of the polarizer 20' may be perpendicular to each other. The first optical element includes a retardation film containing a styrene-based resin and a polycarbonate-resin and satisfying the below-indicated expressions (1) and (2), and the second optical element has substantially optical isotropy.

$$240 \text{ nm} \leq Re[590] \leq 350 \text{ nm} \quad (1)$$

$$0.20 \leq Rth[590]/Re[590] \leq 0.80 \quad (2)$$

(In the expressions (1) and (2), Re[590] and Rth[590] respectively represent in-plane retardation and thickness direction retardation values of the film measured by using light of a wavelength of 590 nm at 23° C.)

The polarizer 20' is preferably arranged such that its absorption axis is substantially parallel to an initial alignment direction of the liquid crystal cell 10. The polarizer 20 is preferably arranged such that its absorption axis is substantially perpendicular to the initial alignment direction of the liquid crystal cell 10.

The liquid crystal panel of the present invention may be of so-called o-mode or so-called E-mode. The term "liquid crystal panel of O-mode" refers to a liquid crystal panel in which an absorption axis of a polarizer arranged on a backlight side of a liquid crystal cell and an initial alignment direction of the liquid crystal cell are parallel to each other. The term "liquid crystal panel of E-mode" refers to a liquid crystal panel in which an absorption axis of a polarizer arranged on a backlight side of a liquid crystal and an initial alignment direction of the liquid crystal cell are perpendicular to each other. In the liquid crystal panel of O-mode as shown in FIG. 2A, the polarizer 20 and the first optical element 30 are preferably arranged on a viewer side of the liquid crystal cell 10, and the second optical element 40 and the polarizer 20' are preferably arranged on a backlight side of the liquid crystal cell 10. In the liquid crystal panel of E-mode as shown in FIG. 2B, the polarizer 20 and the first optical element 30 are preferably arranged on a backlight side of the liquid crystal panel 10, and the second optical element 40 and the polarizer 20' are preferably arranged on a viewer side of the liquid crystal cell 10. In the present invention, a liquid crystal panel of O-mode as shown in FIG. 2A is preferred because an arrangement of O-mode can realize better optical compensation. To be specific, in the arrangement of O-mode, the first optical element including the retardation film is arranged on a far side from backlight and thus hardly receives adverse effects due to heat of backlight, to thereby provide a liquid crystal display apparatus with little display unevenness. Hereinafter, detailed description will be given of components of the liquid crystal panel according to the present invention.

B. Liquid Crystal Cell

Referring to FIG. 1, the liquid crystal cell 10 used in the liquid crystal panel of the present invention is provided with: a pair of substrates 11 and 11'; and a liquid crystal layer 12 as a display medium arranged between the substrates 11 and 11'. One substrate (color filter substrate) 11 is provided with color filters and black matrix (both not shown). The other substrate (active matrix substrate) 11' is provided with: a switching element (typically TFT, not shown) for controlling electrooptic properties of liquid crystals; a scanning line (not shown) for providing a gate signal to the switching element and a signal line (not shown) for providing a source signal thereto; and a pixel electrode and a counter electrode (both not shown). The color filters may be provided in the active matrix substrate 11' as well. A distance (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

The liquid crystal layer 12 preferably includes homogeneously aligned nematic liquid crystals in the absence of an electric field. The liquid crystal layer (eventually, liquid crystal cell) generally exhibits a refractive index profile of nx>ny=nz (wherein, nx, ny, and nz respectively represent refractive indices in a slow axis direction, fast axis direction, and thickness direction of a film) In the specification of the present invention, ny=nz includes not only a case where ny and nz are perfectly equal, but also a case where ny and nz are substantially equal. Further, the phrase "initial alignment direction of the liquid crystal cell" refers to a direction providing a maximum in-plane refractive index of the liquid crystal layer by alignment of nematic liquid crystals in the liquid crystal layer in the absence of an electric field. Typical examples of drive mode using the liquid crystal layer exhibiting such refractive index profile include: in-plane switching (IPS) mode; and fringe field switching (FFS) mode.

In the IPS mode, homogeneously aligned nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), normally black mode provides completely black display in the absence of an electric field by: aligning an alignment direction of the liquid crystal cell with an absorption axis of one polarizer in the absence of application of an electric field; and arranging the polarizing plates above and below the liquid crystal cell to be perpendicular to each other. Under application of an electric field, liquid crystal molecules rotate while remaining parallel with substrates, to thereby obtain a transmittance in accordance with a rotation angle. The IPS mode includes super in-plane switching (S-IPS) mode and advanced super in-plane switching (AS-IPS) mode employing a V-shaped electrode, a zigzag electrode, or the like. Examples of a commercially available liquid crystal display apparatus of IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

In the FFS mode, homogeneously aligned nematic liquid crystals in the absence of an electric field respond in an electric field parallel to substrates (also referred to as a horizontal electric field) and generated between a counter electrode and a pixel electrode each formed of transparent conductor, for example, by utilizing an electrically controlled birefringence (ECB) effect. The horizontal electric field in FFS mode is referred to as a fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, normally black mode provides completely black display in the absence of an electric field by: aligning an alignment direction of the liquid crystal cell with an absorption axis of one polarizer in the absence of application of an electric field; and arranging polarizing plates above and below the liquid crystal cell to be perpendicular to each other. Under application of an electric field, liquid crystal molecules rotate while remaining parallel with substrates, to thereby obtain a transmittance in accordance with a rotation angle. The FFS mode includes advanced fringe field switching (A-FFS) mode or ultra fringe field switching (U-FFS) mode employing a V-shaped electrode, a zigzag electrode, or the like. An example of a commercially available liquid crystal display apparatus of FFS mode includes Tablet PC "M1400" (trade name, manufactured by Motion Computing, Inc.).

The homogeneously aligned nematic liquid crystals are obtained as a result of interaction between substrates subjected to alignment treatment and nematic liquid crystal molecules, in which alignment vectors of the nematic liquid crystal molecules are parallel to a substrate plane and uniformly aligned. In the specification of the present invention, homogenous alignment includes a case where the alignment vectors are slightly inclined with respect to the substrate plane, that is, a case where the nematic liquid crystal molecules are pretilted. In a case where the nematic liquid crystals are pretilted, a pretilt angle is preferably 20° or less for maintaining a large contrast ratio and obtaining good display properties.

Any appropriate nematic liquid crystals may be employed as the nematic liquid crystals in accordance with the purpose. The nematic liquid crystals may have positive dielectric anisotropy or negative dielectric anisotropy. A specific example of the nematic liquid crystals having positive dielectric anisotropy includes "ZLI-4535" (trade name, manufactured by Merck Ltd., Japan). A specific example of the nematic liquid crystals having negative dielectric anisotropy includes "ZLI-2806" (tradename, manufactured by Merck Ltd., Japan). A difference between an ordinary refractive index (no) and an extraordinary refractive index (ne), that is, a birefringence ($\Delta n_{LC}$) can be appropriately set in accordance with response speed of the liquid crystals, transmittance, and the like. However, the birefringence is preferably 0.05 to 0.30, in general.

Any appropriate cell gap may be employed as the cell gap (distance between substrates) of the liquid crystal cell in accordance with the purpose. However, the cell gap is preferably 1.0 to 7.0 µm. A cell gap within the above range can reduce response time and provide good display properties.

C. Polarizer

Any appropriate polarizers may be employed as the polarizer used in the present invention in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 5 to 80 µm. The polarizers arranged on both sides of the liquid crystal cell may be the same or different from each other.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

D. First Optical Element

Referring to FIGS. 1, 2A, and 2B, the first optical element 30 is arranged between the liquid crystal cell 10 and the polarizer 20. The first optical element 30 includes a retardation film containing a styrene-based resin and a polycarbonate-based resin and satisfying the following expressions (1) and (2).

$$240 \text{ nm} \leq Re[590] \leq 350 \text{ nm} \tag{1}$$

$$0.20 \leq Rth[590]/Re[590] \leq 0.80 \tag{2}$$

D-1. Optical Properties of First Optical Element

In the specification of the present invention, Re[590] refers to an in-plane retardation value measured by light of a wavelength of 590 nm at 23° C. Re[590] can be determined from an equation Re[590]=(nx−ny)×d (wherein, nx and ny respectively represent refractive indices of the film in a slow axis direction and a fast axis direction at a wavelength of 590 nm, and d (nm) represents a thickness of the film). Note that, the slow axis refers to a direction providing a maximum in-plane refractive index.

The first optical element has Re[590] of 240 to 350 nm, preferably 240 to 300 nm, more preferably 260 to 280 nm, and particularly preferably 265 to 275 nm. Re[590] is adjusted to about ½ of the measuring wavelength, to thereby enhance a contrast ratio of the liquid crystal display apparatus in an oblique direction.

In the specification of the present invention, Rth[590] refers to a thickness direction retardation value measured by light of a wavelength of 590 nm at 23° C. Rth[590] can be determined from an equation Rth[590]=(nx−nz)×d (wherein, nx and nz respectively represent refractive indices of the film in a slow axis direction and a thickness direction at a wavelength of 590 nm, and d (nm) represents a thickness of the film). Note that, the slow axis refers to a direction providing a maximum in-plane refractive index.

The first optical element has Rth[590] of preferably 35 to 190 nm, more preferably 90 to 190 nm, particularly preferably 100 to 165 nm, and most preferably 120 to 155 nm.

Re[590] and Rth[590] may be determined by using "KOBRA-21ADH" (trade name, manufactured by Oji Scientific Instruments). Refractive indices nx, ny, and nz can be determined by: using an in-plane retardation value (Re) of the film measured at a wavelength of 590 nm at 23° C., a retardation value (R40) measured by inclining a slow axis by 40° as a tilt angle, a thickness (d) of the retardation film, and an average refractive index (n0) of the retardation film; and using the following equations (i) to (vi) for computational numerical calculation. Then, Rth can be calculated from the following equation (iv). Here, Φ and ny' are represented by the following respective equations (v) and (vi).

$$Re=(nx-ny)\times d \quad (i)$$

$$R40=(nx-ny')\times d/\cos(\Phi) \quad (ii)$$

$$(nx+ny+nz)/3=n0 \quad (iii)$$

$$Rth=(nx-nz)\times d \quad (iv)$$

$$\Phi=\sin^{-1}[\sin(40°)/n0] \quad (v)$$

$$ny'=ny\times nz/[ny^2\times\sin^2(\Phi)+nz^2\times\cos^2(\Phi)]^{1/2} \quad (vi)$$

In the specification of the present invention, Rth[590]/Re[590] refers to a ratio (also referred to as Nz coefficient) of a thickness direction retardation value to an in-plane retardation value measured by using light of a wavelength of 590 nm at 23° C.

Rth[590]/Re[590] of the first optical element is preferably 0.2 to 0.8, more preferably 0.2 to 0.7, furthermore preferably 0.2 to 0.6, particularly preferably 0.4 to 0.6, and most preferably 0.45 to 0.55. Rth[590]/Re[590] of the retardation film of 0.5 can provide substantially constant retardation values regardless of an angle and can enhance a contrast ratio of the liquid crystal display apparatus in an oblique direction.

Wavelength dispersion property of the first optical element is preferably 0.81 to 1.10, and particularly preferably 0.95 to 1.05. Smaller wavelength dispersion property within the above ranges provides constant retardation values in a wide region of visible light. As a result, a contrast ratio of the liquid crystal display apparatus can be enhanced in an oblique direction, and an amount of color shift in an oblique direction can be reduced. Note that, the wavelength dispersion property of the retardation film generally refers to wavelength dependence of retardation values. The wavelength dispersion property can be represented by a ratio of in-plane retardation values Re[480]/Re[590] measured by using light of wavelengths of 480 nm and 590 nm at 23° C. Note that, Re[480] and Re[590] respectively represent in-plane retardation values measured by using light of wavelengths of 480 nm and 590 nm at 23° C.

D-2. Means for Arranging First Optical Element

Any appropriate methods may be employed as a method of arranging the first optical element 30 between the liquid crystal cell 10 and the polarizer 20 in accordance with the purpose. The first optical element 30 is preferably attached to the polarizer 20 and the liquid crystal cell 10 by providing an adhesive layer or pressure sensitive adhesive layer (not shown) on both sides of the first optical element 30. In this way, contrast of a liquid crystal display apparatus employing the first optical element 30 can be enhanced.

A thickness of the adhesive or the pressure sensitive adhesive layer can be appropriately set in accordance with intended use, adhesive strength, and the like. However, the thickness thereof is generally 1 to 500 μm, preferably 5 to 200 μm, and particularly preferably 10 to 100 μm.

Any appropriate adhesives or pressure sensitive adhesives may be employed for forming the adhesive layer or the pressure sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, an acrylic pressure sensitive adhesive is preferably used from the viewpoint of excellent optical transparency, adhesive properties including moderate wettability, cohesiveness and adhesiveness, and excellent weatherability and thermal resistance.

The first optical element 30 is preferably arranged such that its slow axis is substantially parallel or perpendicular to an absorption axis of the adjoining polarizer 20. More preferably, the first optical element 30 is arranged such that its slow axis is substantially parallel to the absorption axis of the adjoining polarizer 20 to allow roll production of the film and facilitate attachment of the film. As a result, production efficiency may improve significantly. In the specification of the present invention, the phrase "substantially parallel" includes a case where the slow axis of the first optical element 30 and the absorption axis of the polarizer 20 form an angle of 0°±2.0°, preferably 0°±1.0°, and more preferably 0°±0.5°. In the specification of the present invention, the phrase "substantially perpendicular" includes a case where the slow axis of the first optical element 30 and the absorption axis of the polarizer 20 form an angle of 90°±2.0°, preferably 90°±1.0°, and more preferably 90°±0.5°. An angle greatly departing from the above ranges may cause degradation in degree of polarization of the polarizing plates, and degradation of contrast when the first optical element is used in a liquid crystal display apparatus.

D-3. Structure of First Optical Element

A structure (laminate structure) of the first optical element is not particularly limited as long as the first optical element includes a retardation film containing a styrene-based resin and a polycarbonate-based resin and the first optical element satisfies the optical properties as described in the above section D-1. To be specific, the first optical element may be: a single retardation film containing a styrene-based resin and a polycarbonate-based resin; a laminate of two or more retardation films; or a laminate of the retardation film and another film (preferably isotropic film) The first optical element is preferably a single retardation film for reducing shift or unevenness in retardation values due to shrinkage stress of the polarizer or heat of backlight and for reducing a thickness of a liquid crystal panel. The first optical element as a laminate may include an adhesive layer, a pressure sensitive adhesive layer, or the like. In a case where the first optical element as a laminate includes two or more retardation films and/or two or more other films, the retardation films and/or the other films may be the same or different from each other. Details of the polycarbonate-based resin, styrene-based resin, and other films will be described later.

Re[590] of the retardation film used for the first optical element can be appropriately selected in accordance with the number of retardation films to be used. For example, in a case where the first optical element is formed of a single retardation film, Re[590] of the retardation film is preferably equal to Re[590] of the first optical element. Thus, retardation of a pressure sensitive adhesive layer, an adhesive layer, or the like used for lamination of the first optical element on the polarizer or the liquid crystal cell is preferably as small as possible. Further, in a case where the first optical element is a laminate including two or more retardation films, for example, total Re[590] of the retardation films is preferably designed to be equal to Re[590] of the first optical element. To be specific, in a case where two retardation films are used, retardation films each having Re[590] of 100 to 175 nm are preferably used. Further, slow axes of the two retardation films are preferably laminated parallel to each other.

Rth[590]/Re[590] of the retardation film is preferably equal to Rth[590]/Re[590] of the first optical element regardless of the number of retardation films to be used. For example, an optical element having Rth[590]/Re[590] of 0.5 and Re[590] of 280 nm can be obtained by laminating two retardation films each having Rth[590]/Re[590] of 0.5 and Re[590] of 140 nm such that the respective slow axes are parallel to each other.

A total thickness of the first optical element is preferably 10 to 200 µm, more preferably 15 to 150 µm, particularly preferably 40 to 100 µm, and most preferably 50 to 80 µm. The first optical element has a thickness within the above ranges, to thereby provide a liquid crystal display apparatus having excellent optical uniformity.

Figure 3A:
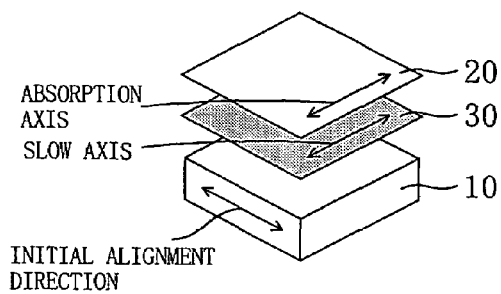
FIGS. 3A to 3H are each a schematic perspective view illustrating a typical preferred embodiment of a first optical element used in the present invention including its relationship with an absorption axis of a polarizer.
Figure 3B:
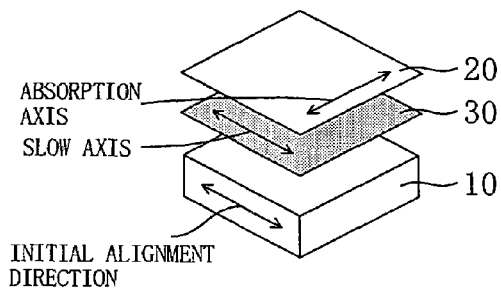
Figure 3C:
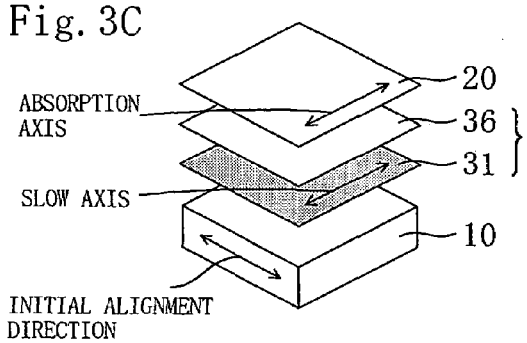
Figure 3D:
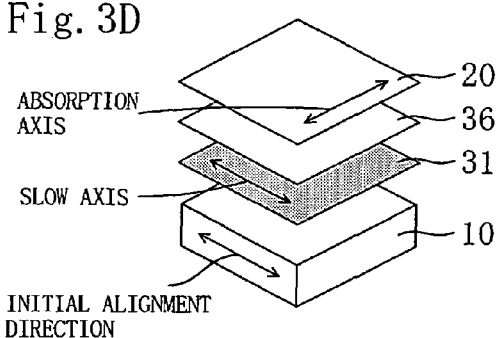
Figure 3E:
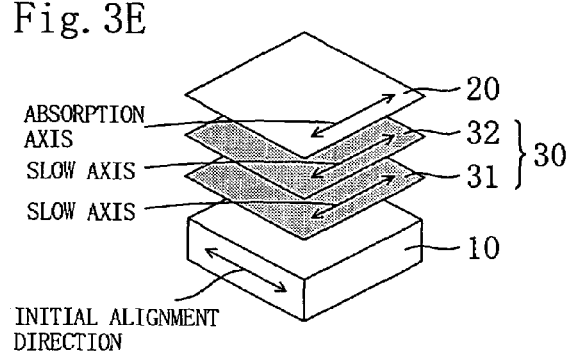
Figure 3F:
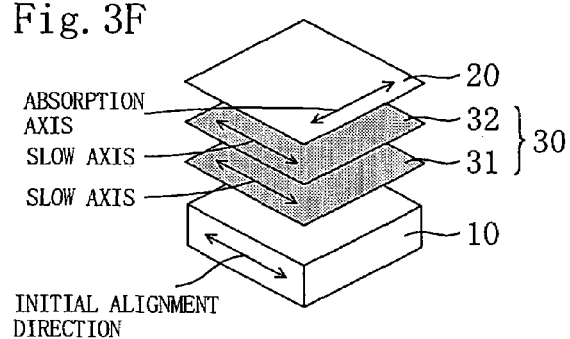
Figure 3G:
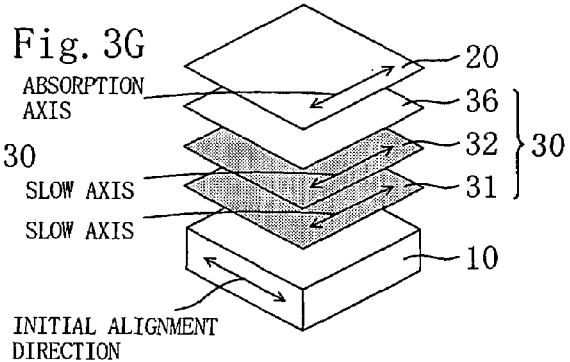
Figure 3H:
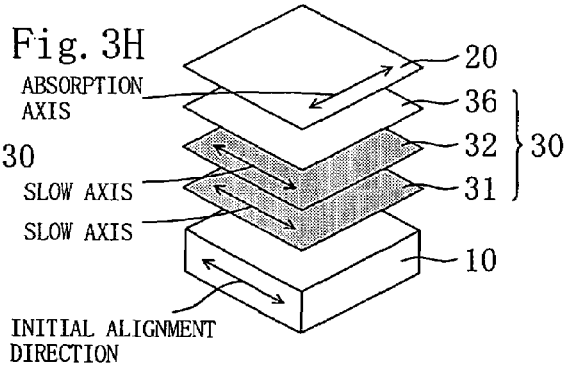

FIGS. 3A to 3H are each a schematic perspective view illustrating a typical preferred embodiment of the first optical element used in the present invention including its relationship with an absorption axis of a polarizer. FIGS. 3A and 3B each show a case where the first optical element 30 is a single retardation film. FIG. 3A shows a case where a slow axis of the retardation film (the first optical element) 30 is parallel to an absorption axis of the polarizer 20, and FIG. 3B shows a case where the slow axis of the retardation film (the first optical element) 30 is perpendicular to the absorption axis of the polarizer 20. In such embodiments, the retardation film also serves as a protective film for the polarizer on a side of the liquid crystal cell, to thereby contribute to reduction in thickness of the liquid crystal panel. Further, such embodiments are preferred from the viewpoints of small effects of shift or unevenness in retardation values due to shrinkage stress of the polarizer or heat of backlight. FIGS. 3C and 3D each show a case where the first optical element 30 is a laminate of one retardation film 31 and another film (preferably isotropic film) 36. FIG. 3C shows a case where a slow axis of the retardation film 31 is parallel to the absorption axis of the polarizer 20, and FIG. 3D shows a case where the slow axis of the retardation film 31 is perpendicular to the absorption axis of the polarizer 20. The other film 36 is preferably arranged on a side of the polarizer 20. In such embodiments, the other film serves as a protective film for the polarizer on a side of the liquid crystal cell. An isotropic film may be used as the other film, to thereby eliminate adverse effects ascribable to Rth of a conventional protective film for a polarizing plate. FIGS. 3E and 3F each show a case where the first optical element 30 is a laminate of two retardation films 31 and 32, and FIGS. 3G and 3H each show a case where the first optical element 30 is a laminate of two retardation films 31 and 32, and another film 36. As described above, the retardation films 31 and 32 each have Re[590] designed such that total Re[590] is equal to Re[590] of the first optical element, and each have Rth[590]/Re[590] designed to be equal to Rth[590]/Re[590] of the first optical element. Cases where the first optical film 30 includes at most two retardation films and at most one other film were described for simplicity. However, the present invention can be obviously applied to laminates each having three or more retardation films and/or two or more other films.

D-4. Retardation Film Containing Styrene-Based Resin and Polycarbonate-Based Resin As described above, the first optical element used in the present invention includes a retardation film containing a styrene-based resin and a polycarbonate-based resin (hereinafter, may be referred to as styrene/polycarbonate blend). The retardation film is a stretched polymer film containing a styrene-based resin and a polycarbonate-based resin. The polymer film containing a styrene-based resin and a polycarbonate-based resin to be used preferably has a small photoelastic coefficient and easily causes retardation. In the retardation film, the styrene-based resin is used for reducing the photoelastic coefficient.

The photoelastic coefficient of the retardation film generally refers to ease of causing birefringence when external force is applied to an optical film to cause internal stress. An absolute value of photoelastic coefficient of the retardation film is preferably small, to thereby provide excellent optical uniformity and inhibit unevenness in retardation due to distortion or the like. The photoelastic coefficient can be determined by: using a spectroscopic ellipsometer "M-220" (trade name, manufactured by JASCO Corporation); measuring an in-plane retardation value of a sample piece of 2 cm×10 cm under stress by using light of a wavelength of 590 nm at 23° C.; and calculating the photoelastic coefficient from a slope of a function of the retardation value and the stress.

An absolute value of photoelastic coefficient $C[590](m^2/N)$ of the retardation film measured by using light of a wavelength of 590 nm at 23° C. is preferably $2.0 \times 10^{-11}$ to $8.0 \times 10^{-11}$, more preferably $2.0 \times 10^{-11}$ to $6.0 \times 10^{-11}$, particularly preferably $3.0 \times 10^{-11}$ to $6.0 \times 10^{-11}$, and most preferably $4.0 \times 10^{-11}$ to $6.0 \times 10^{-11}$. A photoelastic coefficient within the above ranges can provide a retardation film hardly causing shift or unevenness in retardation values due to shrinkage stress of the polarizer or heat of backlight and having a relationship of nx>nz>ny. In a case where a single retardation film is used, an absolute value of photoelastic coefficient of the retardation film is regarded as the absolute value of photoelastic coefficient of the first optical element. Such a retardation film is used, to thereby significantly improve display unevenness of the liquid crystal display apparatus in an oblique direction.

A thickness of the retardation film may vary in accordance with the number of retardation films to be laminated and the presence or absence of other films. The total thickness of the first optical element to be obtained may be set to preferably 10 to 200 µm, more preferably 15 to 150 µm, particularly preferably 40 to 100 μm, and most preferably 50 to 80 μm. For example, in a case where the first optical element is formed of a single retardation film, a thickness of the retardation film is preferably 10 to 200 μm (that is, equal to the total thickness of the first optical element). Further, in a case where the first optical element is a laminate of two retardation films, for example, each retardation film may have any appropriate thickness as long as the total thickness of the retardation films is equal to a preferred total thickness of the first optical element. Thus, the thickness of the retardation films may be the same or different from each other. In an embodiment where two retardation films are laminated, one retardation film has a thickness of preferably 5 to 100 μm, and the other retardation film has a thickness of preferably 50 to 100 μm.

A content of the styrene-based resin in the styrene/polycarbonate blend is preferably 10 to 40 parts by weight, more preferably 20 to 40 parts by weight, particularly preferably 22 to 38 parts by weight, and most preferably 25 to 35 parts by weight with respect to 100 parts by weight of the total solid content. A content of the styrene-based resin within the above ranges can sufficiently reduce the photoelastic coefficient of the retardation film, and can assure a glass transition temperature (also referred to as Tg) or rigidity appropriate for durability, self-bearing property, stretch property, and the like. As a result, a retardation film hardly causing shift or unevenness in retardation values due to stress and having a relationship of nx>nz>ny even when it is used for the liquid crystal display appratus can be obtained.

The content of the styrene-based resin can be determined by subjecting retardation film containing a styrene-based resin and a polycarbonate-based resin to GPC measurement. To be specific, the retardation film is dissolved in tetrahydrofuran, to thereby prepare a 0.1 wt % solution which is left standing for 8 hours. Then, the solution is filtered through a 0.45 μm membrane filter, and a filtrate is measured through a gel permeation chromatograph (GPC) method. The obtained differential molecular weight distribution curve can be divided into a low molecular weight component and a high molecular weight component at a valley between peaks. The content of the styrene-based resin can be determined from an expression [total peak area of low molecular weight component/(total peak area of low molecular weight component+total peak area of high molecular weight component)]×100.

The styrene-based resin refers to a styrene-based polymer obtained through polymerization of a styrene-based monomer by any appropriate methods. Specific examples of the styrene-based monomer include styrene, α-methylstyrene, and 2,4-dimethylstyrene. In addition, a commercially available styrene-based resin or the like may be used. Specific examples thereof include a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer. Such a monomer or a resin may be used alone or in combination. Further, the styrene-based resin and the styrene-based monomer may be used in combination.

The styrene-based resin has a weight average molecular weight (Mw) of preferably less than 20,000, more preferably 1,000 to 10,000, particularly preferably 1,000 to 6,000, and most preferably 1,000 to 3,000 in polystyrene equivalents measured through a GPC method in which tetrahydrofuran is used as a developing solvent. The styrene-based resin having a weight average molecular weight within the above ranges and a polycarbonate-based resin may be mixed homogeneously, to thereby provide a highly transparent film.

Aromatic polycarbonate composed of an aromatic dihydric phenol component and a carbonate component is preferably used as a polycarbonate-based resin used for the retardation film containing a styrene-based resin and a polycarbonate-based resin. Aromatic polycarbonate can generally be obtained through a reaction between an aromatic dihydric phenol compound and a carbonate precursor. That is, aromatic polycarbonate can be obtained through: a phosgene method in which phosgene is blown into an aromatic dihydric phenol compound in the presence of caustic alkali and a solvent; or an ester exchange method in which an aromatic dihydric phenol compound and bisarylcabonate are subjected to ester exchange in the presence of a catalyst. Specific examples of the carbonate precursor include: phosgene; bischloroformates of dihydric phenols; diphenyl carbonate; di-p-tolyl carbonate; phenyl-p-tolyl carbonate; di-p-chlorophenyl carbonate; and dinaphthyl carbonate. Of those, phosgene and diphenyl carbonate are preferred.

Specific examples of the aromatic dihydric phenol compound to react with the carbonate precursor include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. Aromatic dihydric phenol compound may be used alone or in combination. Preferred examples thereof include: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. Particularly preferably, 2,2-bis(4-hydroxyphenyl)propane and 1,1-bis(4-hydroxyphenyl)-3,3,5-trimethylcyclohexane are used in combination, to thereby provide a retardation film having a sufficiently small photoelastic coefficient, and appropriate Tg and rigidity.

The polycarbonate-based resin using as an aromatic dihydric phenol compound 2,2-bis(4-hydroxyphenyl)propane and 1,1-bis(4-hydroxyphenyl)-3,3,5-trimethylcyclohexane in combination contains repeating units represented by the following formulae (5) and (6).

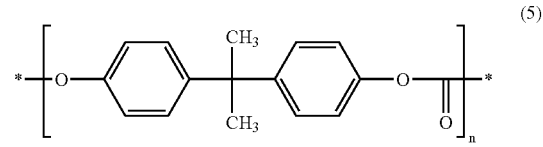

(5)

(6)

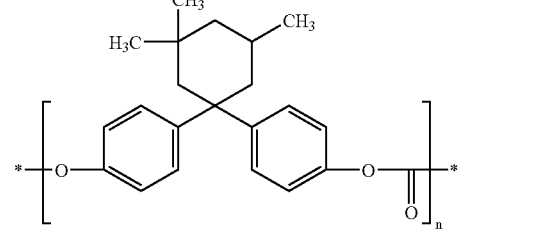

In the formulae (5) and (6), n represents an integer of 2 or more.

In a case where 2,2-bis(4-hydroxyphenyl)propane and 1,1-bis(4-hydroxyphenyl)-3,3,5-trimethylcyclohexane are used in combination as an aromatic dihydric phenol compound, the Tg or photoelastic coefficient of the retardation film can be adjusted by varying a ratio of 2,2-bis(4-hydroxyphenyl)propane to 1,1-bis(4-hydroxyphenyl)-3,3,5-trimethylcyclohexane to be used. For example, a high content of 1,1-bis(4-hydroxyphenyl)-3,3,5-trimethylcyclohexane in the polycarbonate-based resin can increase Tg and decrease the photoelastic coefficient. A weight ratio of 2,2-bis(4-hydroxyphenyl)propane to 1,1-bis(4-hydroxyphenyl)-3,3,5-trimethylcyclohexane in the polycarbonate-based resin is preferably 2:8 to 8:2, more preferably 3:7 to 6:4, particularly preferably 3:7 to 5:5, and most preferably 4:6. The combined use of 2,2-bis(4-hydroxyphenyl)propane and 1,1-bis(4-hydroxyphenyl)-3,3,5-trimethylcyclohexane in the above weight ratios can provide a retardation film having Tg and rigidity for excellent durability, self-bearing property, and stretch property.

In a case where two or more kinds of aromatic dihydric phenol compounds are used, a weight ratio of the aromatic dihydric phenol compound components can be determined by subjecting the retardation film containing a styrene-based resin and a polycarbonate-based resin to $^1$H-NMR measurement.

The polycarbonate-based resin used for the retardation film containing a styrene-based resin and a polycarbonate resin has a weight average molecular weight (Mw) of preferably 25,000 to 200,000, more preferably 30,000 to 150,000, particularly preferably 40,000 to 100,000, and most preferably 50,000 to 80,000 in polystyrene equivalents measured through a GPC method in which tetrahydrofuran is used as a developing solvent. The polycarbonate-based resin having a weight average molecular weight within the above ranges can provide a retardation film having excellent mechanical strength.

A difference between the weight average molecular weights (Mw) of the polycarbonate-based resin and the styrene-based resin (Mw of polycarbonate-based resin–Mw of styrene-based resin) is preferably 24,000 to 92,000, more preferably 29,000 to 87,000, particularly preferably 39,000 to 77,000, and most preferably 49,000 to 67,000. A difference within the above ranges can provide a highly transparent retardation film having excellent mechanical strength.

The retardation film used in the present invention can be obtained by: attaching a shrinkable film to one side or both sides of a polymer film containing a polycarbonate-based resin and a styrene-based resin; and heat stretching the resultant through a vertical uniaxial stretching method by using a roll stretching machine. The shrinkable film is used for providing shrinkage force in a direction perpendicular to a stretching direction during heat stretching, and for increasing a refractive index of the retardation film in a thickness direction. A method of attaching the shrinkable film to one side or both sides of the polymer film is not particularly limited. However, a preferred method thereof involves bonding of the polymer film and the shrinkable film by providing an acrylic pressure sensitive adhesive layer containing as a base polymer an acrylic polymer therebetween because the method is excellent in productivity and workability.

Figure 4:
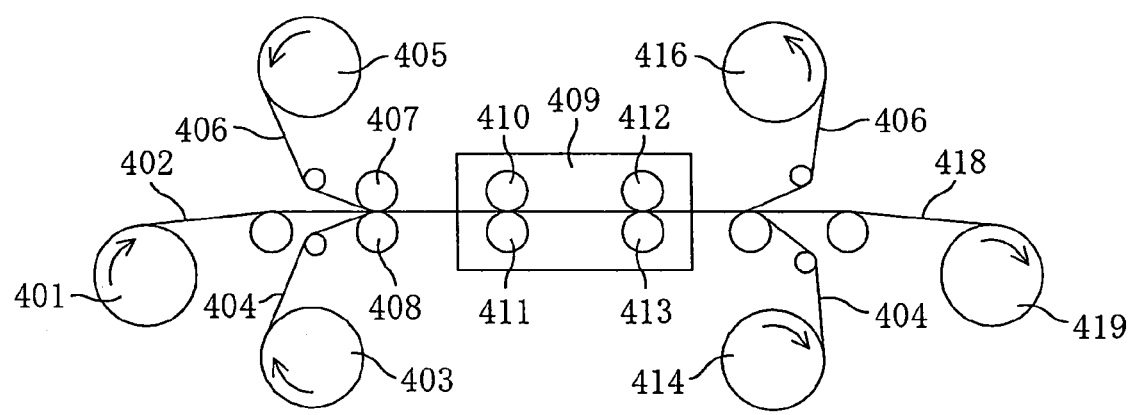
FIG. 4 is a schematic diagram showing a concept of a typical production process of a retardation film used in the present invention.

An example of a method of producing the retardation film of the present invention will be described with reference to FIG. 4. FIG. 4 is a schematic diagram showing a concept of a typical production process of the retardation film of the present invention. For example, a polymer film 402 containing a styrene-based resin and a polycarbonate-based resin is delivered from a first delivery part 401. A shrinkable film 404 provided with a pressure sensitive adhesive layer and delivered from a second delivery part 403, and a shrinkable film 406 provided with a pressure sensitive adhesive layer and delivered from a third delivery part 405 are attached to both sides of the polymer film 402 by laminate rollers 407 and 408. A laminate having the shrinkable films attached to both sides of the polymer film is subjected to stretching treatment while the laminate is maintained at a constant temperature by heating means 409 under tension in a longitudinal direction of the film by rollers 410, 411, 412, and 413 at different speed ratios (under tension in a thickness direction by the shrinkable film at the same time). The shrinkable films 404 and 406 together with the pressure sensitive adhesive layers are peeled off from the laminate subjected to the stretching treatment at a first take-up part 414 and a second take-up part 416, to thereby obtain a retardation film (stretched film) 418. The obtained retardation film 418 is taken-up at a third take-up part 419.

The polymer film containing a styrene-based resin and a polycarbonate resin can be obtained through a casting method from a generally used solution or through a melt extrusion method. A method of mixing resins is not particularly limited. For example, in a case where a film is produced through a casting method, a polycarbonate-based resin and a styrene-based resin at a predetermined ratio are stirred and mixed with a solvent, to thereby prepare a homogeneous solution. Meanwhile, in a case where a film is produced through a melt extrusion method, a polycarbonate-based resin and a styrene-based resin at a predetermined ratio are melted and mixed. The polymer film is preferably obtained through a casting method from the solution, to thereby provide a retardation film having good smoothness and good optical uniformity.

As described above, the shrinkable film is used for providing shrinkage force in a direction perpendicular to a stretching direction during heat stretching, and for increasing a refractive index of the retardation film to be obtained in a thickness direction. Examples of a material used for the shrinkable film include polyester, polystyrene, polyethylene, polypropylene, polyvinyl chloride, and polyvinylidene chloride. A polypropylene film is preferably used from the viewpoints of excellent shrinkage uniformity and thermal resistance.

The shrinkable film is preferably a stretched film such as a biaxially stretched film or a uniaxially stretched film. The shrinkable film can be obtained by: forming an unstretched film through an extrusion method; and stretching the unstretched film in a machine and/or transverse direction at a predetermined stretch ratio by using a simultaneous biaxial stretching machine or the like. The forming and stretching conditions may be appropriately selected in accordance with the purpose, compositions or kinds of resins to be used, and the like. A biaxially stretched polypropylene film is particularly preferably used from the view points of excellent shrinkage uniformity and thermal resistance.

In one embodiment of the present invention, the shrinkable film has a shrinkage ratio in a longitudinal direction of the film $S^{140}$(MD) of 2.7 to 9.4%, and a shrinkage ratio in a width direction of the film $S^{140}$(TD) of 4.6 to 15.8% at 140° C. In another embodiment of the present invention, the shrinkable film has a shrinkage ratio in a longitudinal direction of the film $S^{160}$(MD) of 13 to 23%, and a shrinkage ratio in a width direction of the film $S^{160}$(TD) of 30 to 48% at 160° C. Shrinkage ratios within the above ranges can provide intended retardation values and a retardation film having excellent uniformity.

In one embodiment of the present invention, a difference $\Delta S^{140}=S^{140}(TD)-S^{140}(MD)$ between the shrinkage ratio in a width direction of the film $S^{140}(TD)$ and the shrinkage ratio in a longitudinal direction of the film $S^{141}(MD)$ falls within a range of $0.1\% \leq \Delta S^{140} \leq 3.9\%$ at 140° C. In another embodiment of the present invention, a difference $\Delta S^{160}=S^{160}(TD)-S^{160}(MD)$ between the shrinkage ratio in a width direction of the film $S^{160}(TD)$ and the shrinkage ratio in a longitudinal direction of the film $S^{140}(MD)$ falls within a range of $8\% \leq \Delta S^{160} \leq 30\%$ at 160° C. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

The shrinkable film preferably has a shrinkage stress per 2 mm in a width direction $T_A^{140}(TD)$ of 0.15 to 0.75 N/2 mm at 140° C. The shrinkable film preferably has a shrinkage stress per unit area in a width direction $T_B^{140}(TD)$ of 2.5 to 12.5 N/mm$^2$ at 140° C. A shrinkage stress within the above ranges can provide intended retardation values and allows uniform stretching.

The shrinkable film preferably has a shrinkage stress per 2 mm in a width direction $T_A^{150}(TD)$ of 0.20 to 0.85 N/2 mm at 150° C. The shrinkable film preferably has a shrinkage stress per unit area in a width direction $T_B^{150}(TD)$ of 3.3 to 14.2 N/mm$^2$ at 150° C. A shrinkage stress within the above ranges can provide intended retardation values and allows uniform stretching.

The shrinkage ratios S(MD) and S(TD) can be determined in accordance with a heat shrinkage ratio A method of JIS Z1712 (except that: a heating temperature is changed from 120° C. to 140° C. or 160° C. as described above; and a load of 3 g is added to a sample piece) To be specific, five samples having a width of 20 mm and a length of 150 mm are sampled from a longitudinal direction (machine direction MD) and a width direction (transverse direction TD), respectively. The sample pieces are each marked at a distance of about 100 mm at a center. The sample pieces each with a load of 3 g are hung vertically into an air-circulating thermostatic bath maintained at 140° C.±3° C. or 160° C.±3° C. The sample pieces are heated for 15 min, taken out of the thermostatic bath, and left standing under standard conditions (room temperature) for 30 min. Then, the distances between marks are measured by using a caliper in accordance with JIS B7507, to thereby obtain an average of five measured values. A shrinkage ratio can be calculated from an equation S(%)=[(distance between marks (mm) before heating–distance between marks (mm) after heating)/distance between marks (mm) before heating]×100.

A commercially available shrinkable film used for applications such as general packaging, food packing, pallet wrapping, shrinkable labels, cap seals, and electrical insulation can be appropriately selected and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN" (trade name, available from Oji paper Co., Ltd.); "FANCYTOP series" (trade name, available from Gunze Ltd.); "TORAYFAN series" (trade name, available from Toray Industries, Inc.); "SUN•TOX-OP series" (tradename, available from SUN•TOX Co., Ltd.); and "TOH-CELLO OP series" (trade name, available from TOH-CELLO Co., Ltd.).

A temperature in a stretching oven (also referred to as stretching temperature) during heat stretching of the polymer film containing a polycarbonate-based resin and a styrene-based resin is preferably a glass transition temperature (Tg) of the polymer film or higher because retardation values of the retardation film to be obtained easily even out, and the film hardly crystallizes (becomes clouded). The stretching temperature is preferably (Tg of the polymer film+1° C.) to (Tg+30° C.).

A glass transition temperature (Tg) of the polymer film is not particularly limited. However, the glass transition temperature (Tg) is preferably 110 to 185° C., more preferably 120 to 170° C., and particularly preferably 125 to 150° C. Tg of 110° C. or higher allows easy production of a film having good thermal stability. Tg of 185° C. or lower allows easy control of in-plane retardation and thickness direction retardation values of the film by stretching. The glass transition temperature (Tg) can be determined through a DSC method in accordance with JIS K7121.

A stretch ratio during heat stretching of the polymer film is not particularly limited and may be appropriately set in accordance with a composition of the polymer film, a kind of a volatile component or the like, a residual amount of the volatile component or the like, designed retardation values, and the like. For example, the stretch ratio is preferably 1.05 to 2.00 times. A delivery speed of the laminate (including the polymer film and the shrinkable film) during stretching is not particularly limited. However, the delivery speed is preferably 0.5 m/min or more, and more preferably 1 m/min or more in consideration of the machine accuracy, stability, and the like of the stretching machine.

D-5. Other Film Used for First Optical Element

In the first optical element 30, the other film which may be laminated on the retardation film containing a polycarbonate-based resin and a styrene-based resin preferably has a small absolute value of photoelastic coefficient.

An absolute value of photoelastic coefficient C[590](m$^2$/N) of the film is preferably $2.0 \times 10^{-13}$ to $8.0 \times 10^{-11}$, more preferably $5.0 \times 10^{-13}$ to $2.0 \times 10^{-11}$, particularly preferably $2.0 \times 10^{-12}$ to $6.0 \times 10^{-12}$, and most preferably $2.0 \times 10^{-12}$ to $5.0 \times 10^{-12}$.

A material for forming the film preferably has excellent transparency, mechanical strength, thermal stability, water shielding property, and the like. Specific examples thereof include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The other film is preferably an isotropic film. In the specification of the present invention, the isotropic film refers to a film having small retardation values providing no effects on optical properties in practical use. Such isotropic film having a small birefringence or photoelastic coefficient may be laminated on the retardation film containing a polycarbonate-based resin and a styrene-based resin. Thus, shrinkage stress of the polarizer transmitted to the retardation film or heat of backlight can be reduced, to thereby further reduce shift or unevenness in retardation values. The retardation film containing a polycarbonate-based resin and a styrene-based resin originally hardly causes shift or unevenness in retardation values due to shrinkage stress of the polarizer or heat of backlight. Thus, the isotropic film may be used in combination with the retardation film, to thereby provide a liquid crystal panel having excellent display properties with very small shift or unevenness in retardation values.

Re[590] of the isotropic film is preferably more than 0 nm and 5 nm or less, more preferably more than 0 nm and 3 nm or less, particularly preferably more than 0 nm and 2 nm or less, and most preferably more than 0 nm and 1 nm or less.

Rth[590] of the isotropic film is preferably more than 0 nm and 10 nm or less, more preferably more than 0 nm and 6 nm or less, particularly preferably more than 0 nm and 4 nm or less, and most preferably more than 0 nm and 2 nm or less.

A thickness of the isotropic film may vary in accordance with the number of isotropic films and/or retardation films to be laminated. For practical use, the isotropic film has a thickness for maintaining appropriate mechanical strength without providing effects on optical properties of the first optical element to be obtained. For example, in an embodiment where two retardation films and one isotropic film are laminated, the isotropic film preferably has a thickness of 20 to 120 μm.

Specific examples of a material for the isotropic film satisfying the retardation values and the photoelastic coefficient include: a norbornene-based resin described in JP06-51117 A prepared by subjecting a ring-opening (co)polymer of a norbornene-based monomer to polymer modification such as maleic acid addition or cyclopentadiene addition as required and hydrogenating the modified product; a norbornene-based resin prepared through addition polymerization of a norbornene-based monomer; and a norbornene-based resin prepared through addition copolymerization of a norbornene-based monomer and an olefin-based monomer (such as ethylene or α-olefin). Another example thereof includes a cycloolefin-based resin described in JP 2002-348324 A prepared through polymerization of at least one of a polycyclic cycloolefin monomer such as norbornene, a monocyclic cycloolefin monomer, and an acyclic 1-olefin monomer in a form of solution, suspension, or molten monomer, or in a gas phase under the presence of a metallocene catalyst.

Further examples thereof include: a polycarbonate-resin described in JP 2001-253960 A having 9,9-bis(4-hydroxyphenyl)fluorene on a side chain; and a cellulose-based resin described in JP 07-112446 A. Another example thereof includes a polymer film described in JP 2001-343529 A, that is, a film obtained from a resin composition containing a thermoplastic resin (A) having a substituted and/or unsubstituted imide group on a side chain, and a thermoplastic resin (B) having substituted and/or unsubstituted phenyl and nitrile groups on a side chain. A specific example thereof is a polymer film obtained from a resin composition containing an alternating copolymer of isobutylene and N-methylmaleimide, and an acrylonitrile/styrene copolymer. Further examples thereof include: a random copolymer of a monomer forming a polymer exhibiting positive birefringence and a monomer forming a polymer exhibiting negative birefringence, described in "Development and applied technology of optical polymer material" (p. 194 to p. 207, published by NTS Inc., 2003); and a polymer doped with anisotropic low molecular weight molecules or birefringent crystals. However, the present invention is not limited thereto.

E. Second Optical Element

Referring to FIGS. 1, 2A, and 2B, the second optical element 40 is arranged between the liquid crystal cell 10 and the polarizer 20'. The second optical element 40 has substantially optical isotropy. In the specification of the present invention, the phrase "has substantially optical isotropy" refers to an optical element which has small retardation values substantially providing no effects on optical properties of the entire liquid crystal panel and which allows optical compensation of birefringence of the liquid crystal cell. For example, the optical element having substantially optical isotropy includes an optical element satisfying the following expressions (3) and (4).

$$0 \text{ nm} \leq Re[590] \leq 10 \text{ nm} \qquad (3)$$

$$0 \text{ nm} \leq Rth[590] \leq 20 \text{ nm} \qquad (4)$$

(In the expressions (3) and (4), Re[590] and Rth[590] respectively represent in-plane retardation and thickness direction retardation values of the film measured by using light of a wavelength of 590 nm at 23° C.)

The second optical element preferably has as small Re[590] as possible for enhancing a contrast ratio of the liquid crystal display apparatus in an oblique direction. For practical use, the second optical element has Re[590] of 0 to 10 nm as described by the expression (3), preferably 0 to 5 nm, particularly preferably 0 to 2 nm, and most preferably 0 to 1 nm.

The second optical element also preferably has as small Rth[590] as possible for enhancing a contrast ratio of the liquid crystal display apparatus in an oblique direction. For practical use, the second optical element has Rth[590] of 0 to 20 nm as described by the expression (4), preferably 0 to 5 nm, more preferably 0 to 3 nm, and most preferably 0 to 2 nm.

A method of arranging the second optical element 40 between the liquid crystal cell 10 and the polarizer 20' is not particularly limited. The second optical element 40 is preferably attached to the liquid crystal cell 10 and the polarizer 20' by providing an adhesive layer or pressure sensitive adhesive layer (not shown) on both sides of the second optical element 40 and by attaching one side of the second optical element to one side of the polarizer 20' and the other side of the second optical element to one side of the liquid crystal cell 10. In this way, contrast of a liquid crystal display apparatus employing the second optical element 40 can be enhanced.

A thickness of the adhesive or the pressure sensitive adhesive layer can be appropriately set in accordance with intended use, adhesive strength, and the like. However, the thickness thereof is generally 1 to 500 μm, preferably 5 to 200 μm, and particularly preferably 10 to 100 μm.

The adhesive or the pressure sensitive adhesive for forming the adhesive layer or the pressure sensitive adhesive layer is not particularly limited. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, an acrylic pressure sensitive adhesive is preferably used from the viewpoint of excellent optical transparency, adhesive properties including moderate wettability, cohesiveness and adhesiveness, and excellent weatherability and thermal resistance.

The second optical element 40 has substantially optical isotropy, but a slow axis may be detected in practical use. In this case, the second optical element 40 is preferably arranged such that its slow axis is substantially parallel or perpendicular to an absorption axis of the adjoining polarizer 20'. More preferably, the second optical element 40 is arranged such that its slow axis is substantially parallel to the absorption axis of the adjoining polarizer 20' to allow roll production of the film and facilitate attachment of the film. As a result, production efficiency may improve significantly. In the specification of the present invention, the phrase "substantially parallel" includes a case where the slow axis of the second optical element 40 and the absorption axis of the polarizer 20' form an angle of 0°±2.0°, preferably 0°±1.0°, and more preferably 0°±0.5°. In the specification of the present invention, the phrase "substantially perpendicular" includes a case where the slow axis of the second optical element 40 and the absorption axis of the polarizer 20' form an angle of 90°±2.0°, preferably 90°±1.0°, and more preferably 90°±0.5°. An angle greatly departing from the above ranges may cause degradation in degree of polarization of the polarizing plates, and degradation of contrast when the second optical element is used for a liquid crystal display apparatus.

The second optical element preferably has as small thickness as possible within a range providing self-standing property and mechanical strength of a film for reducing shift or unevenness in retardation values due to shrinkage stress of the polarizer or heat of backlight. The thickness of the second optical element is typically 20 to 500 µm, more preferably 30 to 300 µm, particularly preferably 40 to 100 µm, and most preferably 50 to 80 µm. The second optical element has a thickness within the above ranges, to thereby provide a liquid crystal panel having excellent display evenness.

The second optical element may be: a single optical film; or a laminate of two or more optical films. The second optical element as a laminate may include an adhesive layer, a pressure sensitive adhesive layer, or the like for lamination of the optical films. The optical film may be an isotropic film or a retardation film as long as the second optical element as a whole has substantially optical isotropy. For example, in a case where two retardation films are laminated, the retardation films are preferably arranged such that respective slow axes are perpendicular to each other, to thereby reduce in-plane retardation values.

The optical film is not particularly limited as long as the present invention can be satisfied, but the optical film preferably has excellent transparency, mechanical strength, thermal stability, water shielding property, and the like. Specific examples of a material for forming the optical film include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

Examples of the optical film include those similar to isotropic films used for the first optical element. Of those, at least one polymer film of a cellulose-based resin, a norbornene-based resin, and a resin containing an alternating copolymer of isobutylene and N-methylmaleimide and an acrylonitrile/styrene copolymer is particularly preferably used from the viewpoints of excellent transparency, excellent mechanical strength, excellent thermal stability, excellent water shielding property, a small photoelastic coefficient, and excellent adhesiveness to a polarizer.

In a case where the second optical element is formed by laminating the retardation films, the second optical element is typically formed by laminating retardation films such that a negative uniaxial retardation film (also referred to as negative C plate) satisfying a refractive index profile of nx≈ny>nz and a positive uniaxial retardation film (also referred to as positive C plate) satisfying a refractive index profile of nz>nx≈ny are laminated to cancel in-plane retardation and thickness direction retardation values of each other (wherein, nx and ny represent main in-plane refractive indices and nz represents a thickness refractive index). In the specification of the present invention, the expression "nx≈ny" is not strictly limited to a case exhibiting a relationship of nx=ny, and a uniaxial retardation film includes a retardation film having Re[590] of 10 nm or less.

A method of laminating the negative C plate and the positive C plate is not particularly limited, but the negative C plate and the positive C plate are preferably attached by providing an adhesive layer or a pressure sensitive adhesive layer therebetween. Further, the negative C plate and the positive C plate are preferably arranged such that the respective in-plane slow axes are perpendicular to each other to cancel in-plane retardation values.

The second optical element preferably employs a laminate film prepared by laminating the negative C plate satisfying the following expressions (7) and (8), and the positive C plate satisfying the following expressions (9) and (10).

$$0 \text{ nm} < Re[590] \leq 10 \text{ nm} \quad (7)$$

$$20 \text{ nm} < Rth[590] \leq 400 \text{ nm} \quad (8)$$

$$0 \text{ nm} < Re[590] \leq 10 \text{ nm} \quad (9)$$

$$-400 \text{ nm} \leq Rth[590] < -20 \text{ nm} \quad (10)$$

(In the expressions (7), (8), (9), and (10), Re[590] and Rth[590] respectively represent in-plane retardation and thickness direction retardation values of the film measured by using light of a wavelength of 590 nm at 23° C.)

Re[590] of the negative C plate is preferably more than 0 nm and 10 nm or less, more preferably more than 0 nm and 3 nm or less, particularly preferably more than 0 nm and 2 nm or less, and most preferably more than 0 nm and 1 nm or less.

Rth[590] of the negative C plate is preferably more than 20 nm and 400 nm or less, more preferably more than 20 nm and 200 nm or less, and most preferably more than 20 nm and 100 nm or less.

The negative C plate has a thickness of preferably 20 to 500 μm, more preferably 30 to 300 μm, particularly preferably 40 to 100 μm, and most preferably 50 to 80 μm.

Examples of a material for forming the negative C plate include: any appropriate polymer films; a film prepared by curing a liquid crystal material exhibiting a cholesteric liquid crystal phase; a film prepared by curing a discotic liquid crystal compound; and an inorganic layered compound.

Specific examples of the polymer film forming the negative C plate include: cellulose-based resins such as diacetyl cellulose and triacetyl cellulose; acrylic resins such as polymethyl methacrylate; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The polymer film used as the negative C plate may be obtained by film formation through a casting method, or may be obtained by stretching through any appropriate stretching methods. Specific examples of the stretching method include: a vertical uniaxial stretching method; a transverse uniaxial stretching method; a vertical and transverse simultaneous biaxial stretching method; and a vertical and transverse sequential biaxial stretching method. The stretching method may be performed by using any appropriate stretching machines such as a roll stretching machine, a tenter, or a biaxial stretching machine. The stretching may be performed in two or more steps. The polymer film may be stretched in a longitudinal direction (machine direction MD) or width direction (transverse direction TD) of the film.

Examples of the material for forming the negative C plate include: a polyimide film described in paragraph [0100] of JP 2003-287750 A; a film prepared by curing a liquid crystal material containing a nematic liquid crystal monomer and a polymerizable chiral agent and exhibiting a cholesteric liquid crystal phase, described in paragraph [0123] of JP 2003-287623 A; a discotic liquid crystal non-aligned layer described in paragraph [0068] of JP 07-281028 A; and a film prepared by applying a water swelling inorganic layered compound on a substrate and drying the resultant, described in paragraph [0034] of JP 09-80233 A.

Re[590] of the positive C plate is preferably more than 0 nm and 10 nm or less, more preferably more than 0 nm and 3 nm or less, particularly preferably more than 0 nm and 2 nm or less, and most preferably more than 0 nm and 1 nm or less.

Rth[590] of the positive C plate is preferably −400 nm or more and less than −20 nm, more preferably −200 nm or more and less than −20 nm, and most preferably −100 nm and more and less than −20 nm.

The positive C plate has a thickness of preferably 0.1 to 50 μm, more preferably 0.1 to 30 μm, particularly preferably 0.1 to 10 μm, and most preferably 0.1 to 5 μm.

An example of the material for forming the positive C plate is a film prepared by applying a liquid crystal composition containing a liquid crystal polymer having mesogenic side-chains, capable of forming homeotropic alignment, and represented by the below-indicated formula (11) on a substrate and drying the resultant, which film is described in Example 1 of JP 2002-174725 A. Another example thereof includes a film, which is described in Example 1 of JP 2003-149441 A, prepared by: applying a composition containing a mixture of the liquid crystal polymer represented by the below-indicated formula (11) and a commercially available polymerizable liquid crystal monomer, and a polymerization initiator, with a solvent on a substrate; forming a uniform vertical alignment (also referred to as homeotropic alignment) of a polymerizable liquid crystal monomer; and curing the resultant.

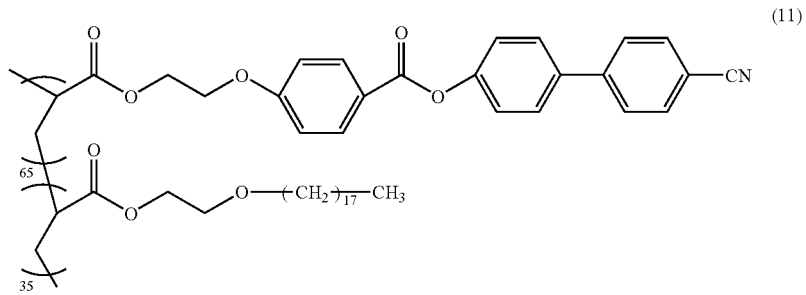

(11)

Figure 5A:
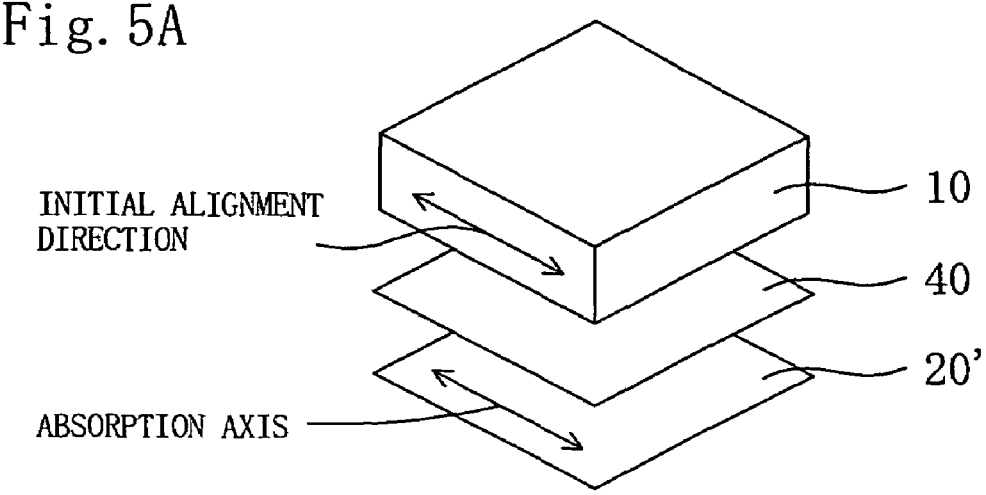
FIGS. 5A and 5B are each a schematic perspective view illustrating a typical preferred embodiment of a second optical element used in the present invention.
Figure 5B:
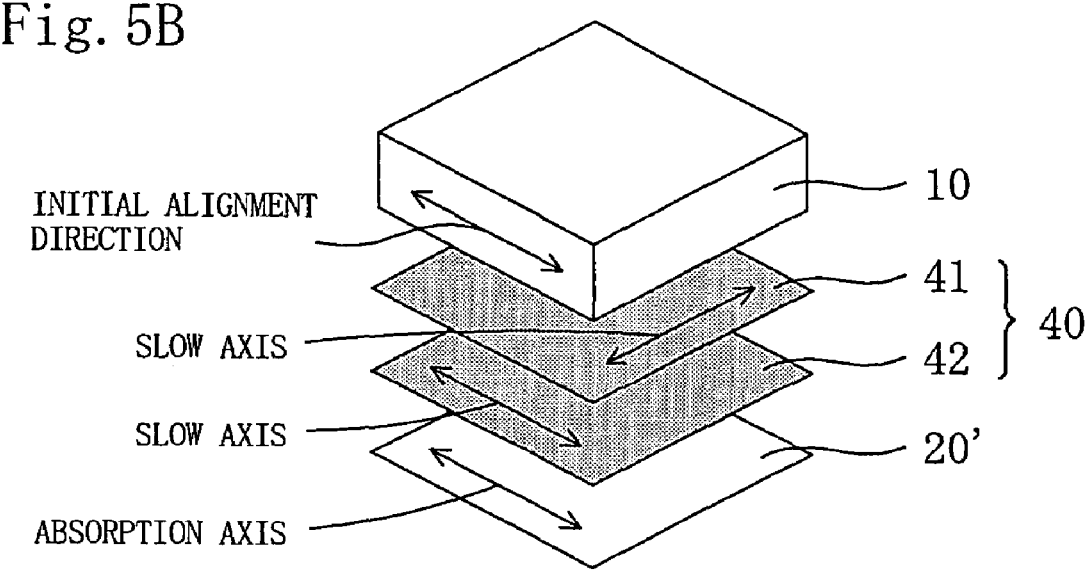

FIGS. 5A and 5B are each a schematic perspective view illustrating a typical preferred embodiment of the second optical element used in the present invention. FIG. 5A shows a case where the second optical element 40 is a single isotropic film. FIG. 5B shows a case where the second optical element 40 is a laminate of a negative C plate 41 and a positive C plate 42. The negative C plate 41 and the positive C plate 42 are arranged such that the respective slow axes are perpendicular to each other. The second optical element is not limited to have the structures of FIGS. 5A and 5B, and may have any appropriate structures having substantially optical isotropy.

F. Protective Film of Polarizer

A transparent film as a protective film for the polarizer may be arranged on the polarizer used for the liquid crystal panel of the present invention on a side where the first optical element or the second optical element is not attached (that is, outer sides of the polarizers 20 and 20' of FIGS. 1, 2A, and 2B).

The transparent film preferably has excellent transparency, mechanical strength, thermal stability, water shielding property, and the like. Examples of a material for forming the transparent film include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resin; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The surface of the transparent film without a polarizer attached thereto may be subjected to hard coat treatment, antireflection treatment, anti-sticking treatment, or diffusion treatment (also referred to as anti-glare treatment). The hard coat treatment is performed for prevention of damages on a surface of a polarizing plate, and a curable coated film with excellent hardness, slip property, and the like may be formed on the surface of the transparent protective film by using any appropriate UV-curable resins such as an acrylic resin or a silicone-based resin. The antireflection treatment is performed for antireflection of outside light at the surface of the polarizing plate. The anti-sticking treatment is performed for prevention of adherence of the polarizing plate with an adjoining layer. The anti-glare treatment is performed for prevention of reflection of outside light at the surface of the polarizing plate to disturb visual recognition of light transmitting through the polarizing plate, and the treatment may be performed, for example, by providing a fine uneven structure on the surface of the transparent protective film through any appropriate systems such as surface roughening system by sandblasting or embossing or a system of mixing transparent fine particles. An anti-glare layer formed through the anti-glare treatment may also serve as a diffusion layer (viewing angle expanding function, for example) for diffusing light transmitting through the polarizing plate and expanding a viewing angle or the like.

G. Other Optical Members

Next, description will be given of other optical members used in combination with the liquid crystal panel of the present invention. Any appropriate optical members that can be applied to the liquid crystal panel may be employed as the other optical member. An example thereof includes an optical film subjected to the hard coat treatment, antireflection treatment, anti-sticking treatment, or diffusion treatment (also referred to as anti-glare treatment). Further, the liquid crystal panel of the present invention may be used in combination with a commercially available brightness enhancement film (polarization separation film having a polarization selection layer, D-BEF, manufactured by Sumitomo 3M Limited, for example), to thereby obtain a display apparatus having better display properties.

H. Liquid Crystal Display Apparatus

Figure 6:
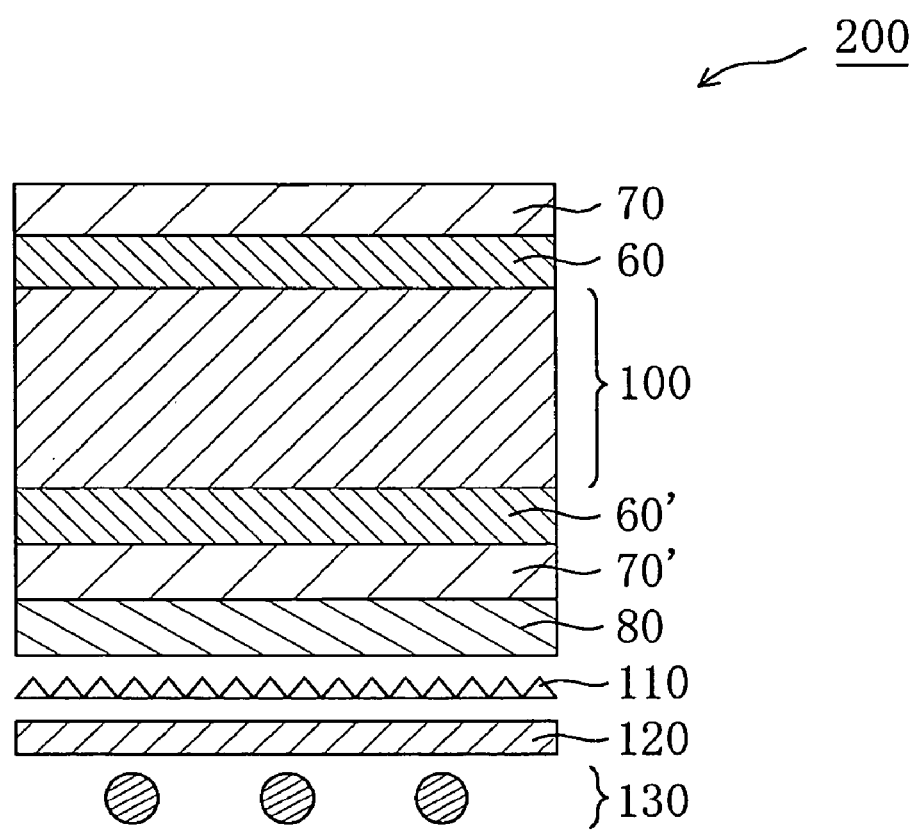
FIG. 6 is a schematic sectional view of a liquid crystal display apparatus according to a preferred embodiment of the present invention.

FIG. 6 is a schematic sectional view of a liquid crystal display apparatus according to a preferred embodiment of the present invention. Note that, ratios among length, width, and thickness of each member in FIG. 6 are different from those of an actual member for clarity. A liquid crystal display apparatus 200 is provided with: a liquid crystal panel 100; protective layers 60 and 60' arranged on both sides of the liquid crystal panel; surface treated layers 70 and 70' arranged on outer sides of the protective layers 60 and 60'; a brightness enhancement film 80 arranged on an outer side (backlight side) of the surface treated layer 70'; a prism sheet 110; a light guide plate 120; and backlight 130. Films subjected to the hard coat treatment, antireflection treatment, anti-sticking treatment, diffusion treatment (also referred to as anti-glare treatment), or the like is used as the surface treated layers 70 and 70'. A polarization separation film having a polarization selection layer "D-BEF series" (trade name, manufactured by Sumitomo 3M Limited, for example) or the like is used as the brightness enhancement film 80. The above-described optical members are used, to thereby obtain a display apparatus with better display properties. The optical members shown in FIG. 6 may be at least partly omitted or replaced by other members in accordance with the drive mode or application of the liquid crystal cell as long as the effects of the present invention are obtained.

The liquid crystal display apparatus of the present invention has a contrast ratio (YW/YB) of preferably 20 or more, more preferably 30 or more, particularly preferably 50 or more, and most preferably 80 or more in an azimuth angle of 45° and a polar angle of 60°.

I. Application of Liquid Crystal Panel and Liquid Crystal Display Apparatus of the Present Invention The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care and medical devices such as a nursing monitor and a medical monitor.

In particular, the liquid crystal panel and liquid crystal display apparatus of the present invention is preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples.

The present invention is not limited to the examples. Analysis methods used in examples are described below.

(1) Identification of polycarbonate-based resin: $^1$H-NMR measurement was performed under the following conditions by using the following apparatus, and the polycarbonate-based resin was determined from an integration ratio of peaks of the obtained spectrum.
Analyzer: "JNM-EX400", manufactured by JEOL Ltd.
Transmitter nucleus: 1H
Frequency: 400 MHz
Pulse width: 45°
Pulse repeating time: 10 seconds
Measurement temperature: room temperature (2) Method of measuring molecular weight, and content of styrene-based resin: The molecular weight and the content of the styrene-based resin were calculated through a gel permeation chromatograph (GPC) method by using polystyrene as a standard sample. To be specific, the molecular weight and the content of the styrene-based resin were measured under the following measurement conditions by using the following apparatus and instruments.
Measurement sample: A sample resin was dissolved in tetrahydrofuran to prepare a 0.1 wt % solution which was left, standing over night. Then, the solution was filtered through a 0.45 μm membrane filter to obtain a filtrate for measurement.
Analyzer: "HLC-8120GPC", manufactured by Tosoh Corporation
Column: TSKgel SuperHM-H/H4000/H3000/H2000
Column size: 6.0 mm I.D.×150 mm
Eluant: tetrahydrofuran
Flow rate: 0.6 ml/min
Detector: RI
Column temperature: 40° C.
Injection amount: 20 μl (3) Method of measuring glass transition temperature (Tg): The glass transition temperature was measured in accordance with JIS K7121 under the following measurement conditions by using the following apparatus.
Analyzer: differential scanning calorimeter "DSC5500", manufactured by Seiko Instruments & Electronics Ltd.
Measurement atmosphere: in a stream of nitrogen at 20 ml/min
Temperature increase rate: 10° C./min (4) Method of measuring retardation values, wavelength dispersion property, angles of slow axes, and light transmittance: The retardation values, wavelength dispersion property, angles of slow axes, and light transmittance were measured by using an automatic birefringence analyzer ("KOBRA-21ADH", trade names manufactured by Oji Scientific Instruments) based on a parallel Nicol rotation method by using light of a wavelength of 590 nm at 23° C.

(5) Method of measuring photoelastic coefficient: The retardation values of the sample were measured under stress by using a spectroscopic ellipsometer "M-220" (trade name, manufactured by JASCO Corporation), and the photoelastic coefficient was calculated from a slope of a function of the stress and retardation values. To be specific, an in-plane retardation value of a sample piece of 2 cm×10 cm was measured under stress of 5N to 15 N by using light of a wavelength of 590 nm at 23° C.

(6) Method of measuring thickness: The thickness was measured by using a digital micrometer "K-351C-type", manufactured by Anritsu Corporation.

(7) Method of measuring shrinkage ratio of shrinkable film: The shrinkage ratios S(MD) and S(TD) were determined in accordance with a heat shrinkage ratio A method of JIS Z1712 (except that: a heating temperature was changed from 120° C. to 140° C. or 160° C.; and a load of 3 g was added to a sample piece). To be specific, five samples having a width of 20 mm and a length of 150 mm were sampled from a longitudinal direction (machine direction (MD)) and a width direction (transverse direction (TD)), respectively. The sample pieces were each marked at a distance of about 100 mm at a center. The sample pieces each with a load of 3 g were hung vertically into an air-circulating thermostatic bath maintained at 140° C.±3° C. or 160° C.±3° C. The sample pieces were heated for 15 min, taken out of the thermostatic bath, and left standing under standard conditions (room temperature) for 30 min. Then, the distances between marks were measured by using a caliper in accordance with JIS B7507, to thereby obtain an average of five measured values. A shrinkage ratio were calculated from an equation S(%)=[(distance between marks (mm) before heating−distance between marks (mm) after heating)/distance between marks (mm) before heating]×100.

(8) Method of measuring shrinkage stress in a width direction (TD) of shrinkable film: The shrinkage stress in a width direction (TD) was measured at 140° C. and 150° C. through a TMA method by using the following apparatus.
Apparatus: "TMA/SS 6100", manufactured by Seiko Instruments Inc.
Data processing: "EXSTAR6000", manufactured by Seiko Instruments Inc.
Measurement mode: measurement with constant temperature increase (10° C./min)
Measurement atmosphere: atmosphere air (room temperature)
Load: 20 mN
Sample size: 15 mm×2 mm (long side corresponds to width direction (TD))
Film thickness: 60 μm (9) Contrast ratio of liquid crystal display apparatus: The contrast ratio was calculated by using the following liquid crystal cell and measurement apparatus. A white image and a black image were displayed on a liquid crystal display apparatus, and Y values of an XYZ display system at an azimuth angle of 45° and a polar angle of 60° of a display screen were measured by using "EZ Contrast 160D" (trade name, manufactured by ELDIM SA). A contrast ratio "YW/YB" in an oblique direction was calculated from a Y value (YW) of the white image and a Y value (YB) of the black image. The azimuth angle of 45° refers to a direction rotated by 45° in a counter clockwise direction from a long side of the panel at 0°.
Liquid crystal cell: liquid crystal cell installed in "KLV-17HR2", manufactured by Sony Corporation
Panel size: 375 mm×230 mm

(10) Method of evaluating display unevenness of liquid crystal display apparatus: A display screen was photographed by using the following liquid crystal cell and measurement apparatus. In Table 4, "Good" refers to a liquid crystal cell providing a difference in brightness of 1.5680 or less across an entire panel, and "No good" refers to a liquid crystal cell providing a difference in brightness of 1.7920 or more.
Liquid crystal cell: liquid crystal cell installed in "KLV-17HR2", manufactured by Sony Corporation
Panel size: 375 mm×230 mm Measurement apparatus: two-dimensional color distribution measurement apparatus "CA-1500", manufactured by Konica Minolta Holdings, Inc.

Measurement environment: dark room (23° C.)

PREPARATION EXAMPLE 1

A polycarbonate-based resin having a weight average molecular weight (Mw) of 60,000 and containing repeating units represented by the following formulae (5) and (6) (number average molecular weight (Mn) of 33,000, Mw/Mn of 1.78, weight ratio (A): (B) of 4:6) was obtained through a conventional method by using phosgene as a carbonate precursor, and (A) 2,2-bis(4-hydroxyphenyl)propane and (B) 1,1-bis(4-hydroxyphenyl)-3,3,5-trimethylcyclohexane as aromatic dihydric phenol components. 70 parts by weight of the polycarbonate-based resin and 30 parts by weight of a styrene-based resin (HIMER SB75, available from Sanyo Chemical Industries, Ltd.) having a weight average molecular weight (Mw) of 1,300 (number average molecular weight (Mn) of 716, Mw/Mn of 1.78) were added into 300 parts by weight of dichloromethane. The whole was mixed under stirring at room temperature for 4 hours, to thereby prepare a clear solution. The solution was cast on a glass plate and left standing at room temperature for 15 min. Then, the solution was peeled off from the glass plate and dried in an oven at 80° C. for 10 min and at 120° C. for 20 min, to thereby obtain a polymer film having a thickness of 55 μm and a glass transition temperature (Tg) of 140° C. Light transmittance of the resultant polymer film at a wavelength of 590 nm was 93%. The polymer film had an in-plane retardation value Re[590] of 5.0 nm, a thickness direction retardation value Rth[590] of 12.0 nm, and an average refractive index of 1.576.

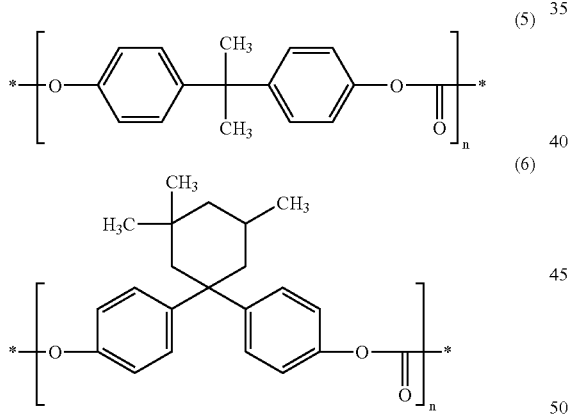

A biaxially stretched polypropylene film "TORAYFAN" (trade name, thickness of 60 μm, available from Toray Industries, Inc.) having the properties shown in. Table 1 was attached to both sides of the polymer film (thickness of 55 μm) through an acrylic pressure sensitive adhesive layer (thickness of 15 μm). Then, the resultant was stretched 1.27 times in an air-circulating thermostatic oven at 147° C. (temperature at a distance of 3 cm from a back surface of the film, temperature fluctuation of ±1° C.) by using a roll stretching machine while a longitudinal direction of the film was held, to thereby produce a retardation film A. Table 2 shows the stretching conditions and the properties of the obtained retardation film A.

TABLE 1

| Shrinkable film | | |
|---|---|---|
| Shrinkage ratio at 140° C. (longitudinal direction) | $S^{140}$(MD)(%) | 5.7 |
| Shrinkage ratio at 140° C. (width direction) | $S^{140}$(TD)(%) | 7.6 |
| Difference in shrinkage ratio at 140° C. (width direction − longitudinal direction) | $\Delta S^{140}$(%) | 1.9 |
| Shrinkage ratio at 160° C. (longitudinal direction) | $S^{160}$(MD)(%) | 18.0 |
| Shrinkage ratio at 160° C. (width direction) | $S^{160}$(TD)(%) | 35.7 |
| Difference in shrinkage ratio at 160° C. (width direction − longitudinal direction) | $\Delta S^{160}$(%) | 17.7 |
| Shrinkage stress at 140° C. in width direction | $T_A^{140}$(TD) (N/2 mm) | 0.45 |
| | $T_B^{140}$(TD) (N/mm²) | 7.5 |
| Shrinkage stress at 150° C. in width direction | $T_A^{150}$(TD) (N/2 mm) | 0.56 |
| | $T_B^{150}$(TD) (N/mm²) | 9.3 |

TABLE 2

| Retardation film | Stretching temperature (° C.) | Stretch ratio (%) | Thickness after stretching (μm) | T [590] (%) | Rth [590]/ Re [590] | Re [590] (nm) | Rth [590] (nm) | C [590] (m²/N) |
|---|---|---|---|---|---|---|---|---|
| Preparation Example 1 | A | 147 | 1.27 | 64 | 92 | 0.49 | 270 | 132 | $5.00 \times 10^{-11}$ |
| Preparation Example 2 | B | 147 | 1.30 | 59 | 92 | 0.50 | 300 | 150 | $5.00 \times 10^{-11}$ |
| Preparation Example 3 | C | 146 | 1.25 | 62 | 92 | 0.48 | 250 | 119 | $5.00 \times 10^{-11}$ |
| Preparation Example 4 | D | 145 | 1.20 | 58 | 92 | 0.50 | 200 | 99 | $5.00 \times 10^{-11}$ |

TABLE 2-continued

| Retardation film | Stretching temperature (° C.) | Stretch ratio (%) | Thickness after stretching (μm) | T [590] (%) | Rth [590]/ Re [590] | Re [590] (nm) | Rth [590] (nm) | C [590] (m²/N) |
|---|---|---|---|---|---|---|---|---|
| Preparation Example 5 | E | 140 | 1.10 | 54 | 92 | 0.50 | 140 | 70 | 5.00 × 10⁻¹¹ |
| Preparation Example 6 | F | 160 | 1.10 | 65 | 92 | 0.48 | 284 | 135 | 1.00 × 10⁻¹⁰ |

The acrylic pressure sensitive adhesive used in Preparation Example 1 was prepared by: using as a base polymer isononyl acrylate (weight average molecular weight of 550,000) synthesized through solution polymerization; and mixing 3 parts by weight of a crosslinking agent of a polyisocyanate compound "CORONATE L" (trade name, available from Nippon Polyurethane Industry Co., Ltd.) and 10 parts by weight of a catalyst "OL-1" (trade name, available from Tokyo Fine Chemical Co., Ltd.) with respect to 100 parts by weight of the base polymer.

The retardation film A obtained in Preparation Example 1 was dissolved in tetrahydrofuran, to thereby prepare a 0.1 wt % solution which was left standing for 8 hours. Then, the solution was filtered through a 0.45 μm membrane filter, and a filtrate was subjected to GPC measurement. A content of the styrene-based resin determined through the GPC measurement was 27 parts by weight with respect to 100 parts by weight of the total solid content.

A weight ratio of the aromatic dihydric phenol compound components was determined through $^1$H-NMR measurement of the retardation film A obtained in Preparation Example 1. To be specific, the polymer film was dissolved in chloroform, and the chloroform solution was dropped into 100 times by weight of methanol, to thereby precipitate (reprecipitate) a white solid at 23° C. The solution was filtered and separated into a methanol soluble fraction and a methanol insoluble fraction. The methanol insoluble fraction was dissolved in chloroform-D for $^1$H-NMR measurement. As a result, a weight ratio of components was 4:6, determined from an integration ratio of peaks at 1.68 ppm (6 H) derived from a methyl group of 2,2-bis(4-hydroxyphenyl) propane and at 2.69 ppm (6 H) derived from a methyl group substituted at a 3-position of a cyclohexyl ring of 1,1-bis (4-hydroxyphenyl)-3,3,5-trimethylcyclohexane in an $^1$H-NMR spectrum.

PREPARATION EXAMPLE 2

A retardation film B was produced in the same manner as in Preparation Example 1 except that the stretch ratio was changed from 1.27 times to 1.30 times. Table 2 shows the stretching conditions and the properties of the obtained retardation film B.

PREPARATION EXAMPLE 3

A retardation film C was produced in the same manner as in Preparation Example 1 except that the stretching temperature was changed from 147° C. to 146° C. and the stretch ratio was changed from 1.27 times to 1.25 times. Table 2 shows the stretching conditions and the properties of the obtained retardation film C.

PREPARATION EXAMPLE 4

A retardation film D was produced in the same manner as in Preparation Example 1 except that the stretching temperature was changed from 147° C. to 145° C. and the stretch ratio was changed from 1.27 times to 1.20 times. Table 2 shows the stretching conditions and the properties of the obtained retardation film D.

PREPARATION EXAMPLE 5

A retardation film E was produced in the same manner as in Preparation Example 1 except that the stretching temperature was changed from 147° C. to 140° C. and the stretch ratio was changed from 1.27 times to 1.10 times. Table 2 shows the stretching conditions and the properties of the obtained retardation film E.

PREPARATION EXAMPLE 6

A polycarbonate-based resin was obtained through a conventional method by using phosgene as a carbonate precursor and bisphenol A as an aromatic dihydric phenol component. Next, a biaxially stretched polypropylene film was attached to both sides of a polymer film (thickness of 60 μm) composed of the polycarbonate-based resin through an acrylic pressure sensitive adhesive layer. Then, the film was stretched 1.10 times in an air-circulating thermostatic oven at 160° C. (temperature at a distance of 3 cm from a back surface of the film, temperature fluctuation of ±1° C.) by using a roll stretching machine while a longitudinal direction of the film was held, to thereby obtain a retardation film F. Table 2 shows the properties of the obtained retardation film F. The biaxially stretched propylene film and the acrylic pressure sensitive adhesive used in Preparation Example 6 were the same as those used in Preparation Example 1. Note that, the polymer film composed of the polycarbonate-based resin had a glass transition temperature (Tg) of 150° C., an in-plane retardation value before stretching of 7 nm, and a thickness direction retardation value before stretching of 15 nm.

PREPARATION EXAMPLE 7

65 parts by weight of an alternating copolymer (N-methylmaleimide content of 50 mol %, glass transition temperature of 157° C.) composed of isobutylene and N-methylmaleimide, 35 parts by weight of an acrylonitrile/styrene copolymer (acrylonitrile content of 27 mol %), and 1 part by weight of 2-(4,6-diphenyl-1,3,5-triazin-2-yl)-5-[(hexyl) oxy]-phenol (ultraviolet absorber) were formed into pellets by using an extruder. Then, the pellets were dried at 100° C. for 5 hours, and were extruded at 270° C. by using a 40 nmΦ single-screw extruder and a T-die having a width of 400 nm. The sheet-like molten resin was cooled on a cooling drum, to thereby produce a polymer film G having a width of about 600 mm and a thickness of about 40 μm. Table 3 shows the properties of the polymer film G.

TABLE 3

| Polymer film | Thickness (μm) | T [590] (%) | Re [590] (nm) | Rth [590] (nm) | C [590] (m²/N) |
|---|---|---|---|---|---|
| Preparation Example 7 | G | 40 | 93 | 0.1 | 1.0 | $4.59 \times 10^{-11}$ |
| Preparation Example 8 | H | 40 | 93 | 1.0 | 2.0 | $3.10 \times 10^{-12}$ |
| Preparation Example 9 | I | 42 | 91 | 0.2 | 3.0 | $5.00 \times 10^{-11}$ |
| Preparation Example 10 | J | 80.55 | 93 | 2.4 | 5.0 | $1.60 \times 10^{-11}$ |
| Preparation Example 11 | K | 100 | 92 | 5.0 | 10.0 | $3.10 \times 10^{-12}$ |
| Preparation Example 12 | L | 40 | 91 | 2.2 | 39.8 | $1.78 \times 10^{-11}$ |
| Preparation Example 13 | M | 80 | 91 | 2.5 | 60.2 | $1.75 \times 10^{-11}$ |

PREPARATION EXAMPLE 8

A commercially available norbornene-based resin film "ZEONOR ZF14-040" (trade name, thickness of 40 μm, available from Zeon Corporation) was used as a polymer film H. Table 3 shows the properties of the polymer film H.

PREPARATION EXAMPLE 9

20 parts by weight of a norbornene-based resin "ARTON" (available from JSR Corporation) was added to 80 parts by weight of cyclopentanone, to thereby prepare a solution. The solution was applied onto a triacetyl cellulose film "UZ-TAC" (tradename, Re[590] of 2.2 nm, Rth[590] of 39.8 nm, available from Fuji Photo Film Co., Ltd.) to a thickness of 150 μm, and the resultant was dried at 140° C. for 3 min. After drying, the norbornene-based film formed on the surface of that TAC film was peeled off, to thereby obtain a transparent cellulose-based resin film as a polymer film I. Table 3 shows the properties of the polymer film I.

PREPARATION EXAMPLE 10

An ethyl silicate solution (2 wt % mixed solution of ethyl acetate and isopropyl alcohol, available from COLCOAT Co., Ltd.) was applied onto a polyethylene terephthalate film "S-27E" (thickness of 75 μm, available from Toray Industries, Inc.) by using a gravure coater. The resultant was dried at 130° C. for 30 sec, to thereby form a glass polymer film having a thickness of 0.1 μm.

5 parts by weight of a liquid crystal polymer (weight average molecular weight (Mw) of 5,000) having mesogenic side-chains, capable of forming homeotropic alignment, and represented by the below-indicated formula (11), 20 parts by weight of a commercially available polymerizable liquid crystal monomer "Paliocolor LC242" (trade name, available from BASF Aktiengesellschaft), and 1.25 parts by weight of a photopolymerization initiator "IRGACURE 907" (trade name, Ciba Specialty Chemicals) were dissolved in 75 parts by weight of cyclohexanone, to thereby prepare a mixed solution. The mixed solution was applied onto the glass polymer film of the laminate (the polyethylene terephthalate film/the glass polymer film) as the substrate by using a bar coater. The resultant was dried in an air-circulating thermostatic oven at 80° C.±1° C. for 2 min, and then cooled to room temperature, to thereby form a liquid crystal layer having vertically aligned polymerizable liquid crystal monomers fixed on a substrate. Next, the liquid crystal layer was irradiated with ultraviolet light (using irradiation equipment having a metal halide lamp as a light source) at 400 mJ/cm² (value measured at a wavelength of 365 nm) from a side having the mixed solution applied. The polymerizable liquid crystal monomer was cured, to thereby produce a positive C plate on the substrate. The obtained positive C-plate had a thickness of 0.55 μm, Re[590] of 0.1 nm, and Rth[590] of −55.2 nm.

The positive C plate was peeled off from the substrate, and laminated on a commercially available triacetyl cellulose film "UZ-TAC" (tradename, Re[590] of 2.5 nm, Rth [590] of 60.2 nm, available from Fuji Photo Film Co., Ltd.) having a thickness of 80 μm such that respective slow axes are perpendicular to each other, to thereby produce a polymer film J. Table 3 shows the properties of the polymer film J.

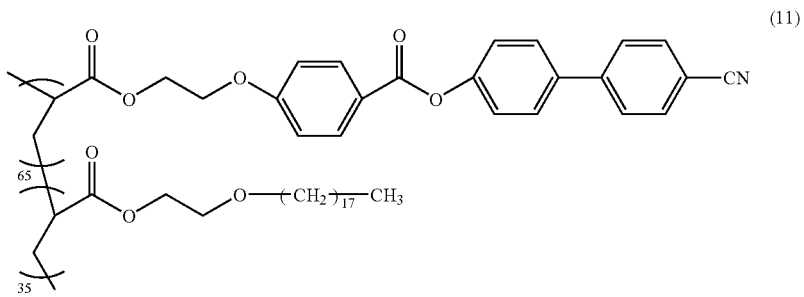

(11)

PREPARATION EXAMPLE 11

A commercially available norbornene-based resin film "ZEONOR ZF14-100" (trade name, thickness of 100 μm, available from Zeon Corporation) was used as a polymer film K. Table 3 shows the properties of the polymer film K.

PREPARATION EXAMPLE 12

A commercially available triacetyl cellulose film "UZ-TAC" (trade name, thickness of 40 μm, available from Fuji Photo Film Co., Ltd.) was used as a polymer film L. Table 3 shows the properties of the polymer film L.

PREPARATION EXAMPLE 13

A commercially available triacetyl cellulose film "UZ-TAC" (trade name, thickness of 80 µm, available from Fuji Photo Film Co., Ltd.) was used as a polymer film M. Table 3 shows the properties of the polymer film M.

EXAMPLE 1

A polyvinyl alcohol film was colored in an aqueous solution containing iodine and then uniaxially stretched 6 times between rollers of different speed ratios in an aqueous solution containing boric acid, to thereby obtain two polarizers P1 and P2. The obtained polarizers P1 and P2 each had a water content of 23%, a thickness of 28 µm, a degree of polarization of 99.9%, and a single axis transmittance of 43.5%. Next, a liquid crystal panel was taken out from a liquid crystal display apparatus "KLV-17HR2" (manufactured by Sony Corporation) including a liquid crystal cell of IPS mode. Polarizing plates arranged above and below the liquid crystal cell were removed, and glass surfaces (front and back surfaces) were washed.

Next, the retardation film A as a first optical element was laminated on a surface of the liquid crystal cell on a viewer side such that a long side of the liquid crystal cell and a slow axis of the retardation film A were parallel to each other. Then, the polarizer P1 was laminated on the surface of the retardation film A such that the slow axis of the retardation film A and an absorption axis of the polarizer P1 were parallel (0°±0.5°) to each other. Then, a commercially available triacetyl cellulose film (trade name "UZ-TAC", thickness of 40 µm, available from Fuji Photo Film Co., Ltd.) was laminated on a surface of the polarizer P1 without the retardation film A laminated thereon.

Next, the polymer film G as a second optical element was laminated on the surface of the liquid crystal cell on a backlight side such that a short side of the liquid crystal cell and a slow axis of the polymer film G were parallel to each other. Then, the polarizer P2 was laminated on the surface of the polymer film G such that the slow axis of the polymer film G and an absorption axis of the polarizer P2 were parallel (0°±0.5°) to each other. Then, a commercially available triacetyl cellulose film (trade name "UZ-TAC", thickness of 40 µm, available from Fuji Photo Film Co., Ltd.) was laminated on a surface of the polarizer P2 without the polymer film G laminated thereon, to thereby produce a liquid crystal panel I of O-mode having the same structure as that shown in FIG. 2A. The thus-produced liquid crystal panel had the absorption axes of the polarizers P1 and P2 perpendicular (90°±1.0°) to each other.

The liquid crystal panel was incorporated into the original liquid crystal display apparatus, and backlight was turned on for 10 min, to thereby measure a contrast ratio in an oblique direction. Table 4 shows the obtained properties.

TABLE 4

| | First optical element | | | Second optical element | | | Liquid crystal panel | |
|---|---|---|---|---|---|---|---|---|
| | Retardation film | Re [590] (nm) | Rth [590]/ Re[590] | Optical film | Re 590 (nm) | Rth [590] (nm) | Contrast ratio in oblique direction | Display unevenness |
| Example 1 | A | 270 | 0.49 | G | 0.1 | 1.0 | 100.0 | Good |
| Example 2 | B | 300 | 0.50 | G | 0.1 | 1.0 | 69.9 | Good |
| Example 3 | C | 250 | 0.48 | G | 0.1 | 1.0 | 64.6 | Good |
| Example 4 | E (two films) | 280 | 0.50 | G | 0.1 | 1.0 | 90.2 | Good |
| Example 5 | A | 270 | 0.49 | H | 1.0 | 2.0 | 97.4 | Good |
| Example 6 | A | 270 | 0.49 | J | 2.4 | 5.0 | 95.2 | Good |
| Example 7 | A | 270 | 0.49 | K | 5.0 | 10.0 | 87.6 | Good |
| Example 8 | A | 270 | 0.49 | K (two films) | 0.0 | 20.0 | 46.9 | Good |
| Comparative Example 1 | D | 200 | 0.50 | G | 0.1 | 1.0 | 15.0 | Good |
| Comparative Example 2 | E | 140 | 0.50 | G | 0.1 | 1.0 | 5.3 | Good |
| Comparative Example 3 | A | 270 | 0.49 | L | 2.2 | 39.8 | 13.9 | Good |
| Comparative Example 4 | A | 270 | 0.49 | M | 2.5 | 60.2 | 6.0 | Good |
| Comparative Example 5 | F | 284 | 0.48 | G | 0.1 | 1.0 | 89.9 | No good |

Figure 7:
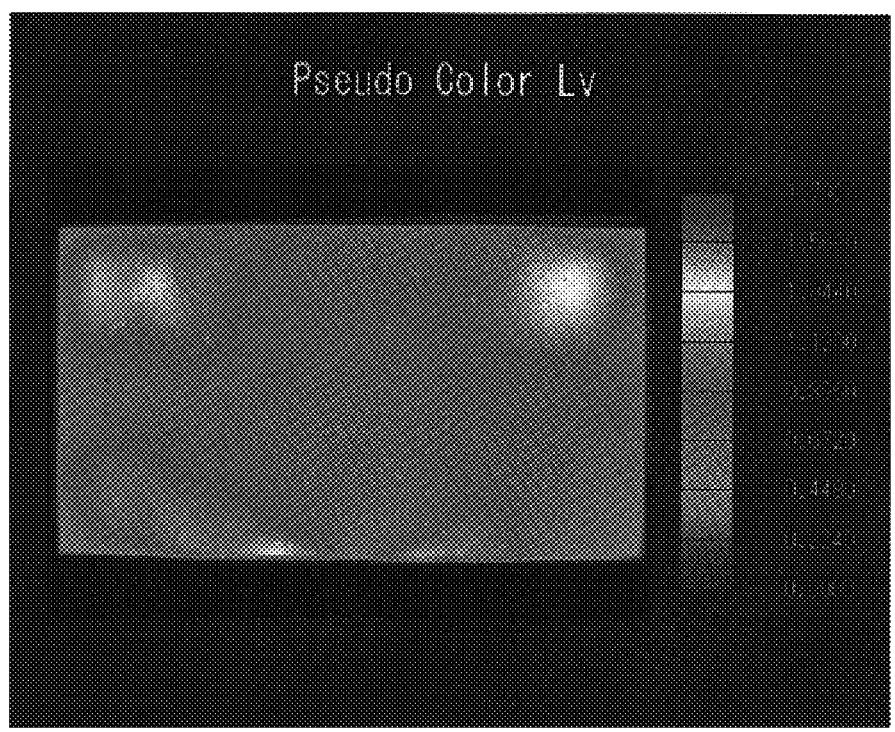
FIG. 7 is a photograph showing results of measurement of display unevenness of a liquid crystal cell according to Example 1 of the present invention.

Then, backlight was turned on for additional 8 hours, and a display screen of the liquid crystal display apparatus was photographed in a dark room by using a two-dimensional color distribution measurement apparatus "CA-1500" (manufactured by Konica Minolta Holdings, Inc.). As shown in FIG. 7, there was little display unevenness due to heat of backlight.

EXAMPLE 2

A liquid crystal panel was produced in the same manner as in Example 1 except that the first optical element was changed from the retardation film A to the retardation film B. Then, a contrast ratio in an oblique direction of a liquid crystal apparatus incorporating the liquid crystal panel was measured. Table 4 shows the obtained properties.

EXAMPLE 3

A liquid crystal panel was produced in the same manner as in Example 1 except that the first optical element was changed from the retardation film A to the retardation film C. Then, a contrast ratio in an oblique direction of a liquid crystal apparatus incorporating the liquid crystal panel was measured. Table 4 shows the obtained properties.

EXAMPLE 4

A liquid crystal panel was produced in the same manner as in Example 1 except that the first optical element was changed from the retardation film A to two retardation films E. Then, a contrast ratio in an oblique direction of a liquid crystal apparatus incorporating the liquid crystal panel was measured. Table 4 shows the obtained properties. The two retardation films E were laminated such that the respective slow axes were parallel to each other.

EXAMPLE 5

A liquid crystal panel was produced in the same manner as in Example 1 except that the second optical element was changed from the polymer film G to the polymer film H. Then, a contrast ratio in an oblique direction of a liquid crystal apparatus incorporating the liquid crystal panel was measured. Table 4 shows the obtained properties.

EXAMPLE 6

A liquid crystal panel was produced in the same manner as in Example 1 except that the second optical element was changed from the polymer film G to the polymer film J. Then, a contrast ratio in an oblique direction of a liquid crystal apparatus incorporating the liquid crystal panel was measured. Table 4 shows the obtained properties.

EXAMPLE 7

A liquid crystal panel was produced in the same manner as in Example 1 except that the second optical element was changed from the polymer film G to the polymer film K. Then, a contrast ratio in an oblique direction of a liquid crystal apparatus incorporating the liquid crystal panel was measured. Table 4 shows the obtained properties.

EXAMPLE 8

A liquid crystal panel was produced in the same manner as in Example 1 except that: the second optical element was changed from the polymer film G to two polymer films K; and the two polymer films K were laminated such that the respective slow axes were perpendicular to each other. Then, a contrast ratio in an oblique direction of a liquid crystal apparatus incorporating the liquid crystal panel was measured. Table 4 shows the obtained properties.

COMPARATIVE EXAMPLE 1

A liquid crystal panel was produced in the same manner as in Example 1 except that the first optical element was changed from the retardation film A to the retardation film D. Then, a contrast ratio in an oblique direction of a liquid crystal apparatus incorporating the liquid crystal panel was measured. Table 4 shows the obtained properties.

COMPARATIVE EXAMPLE 2

A liquid crystal panel was produced in the same manner as in Example 1 except that the first optical element was changed from the retardation film A to the retardation film E. Then, a contrast ratio in an oblique direction of a liquid crystal apparatus incorporating the liquid crystal panel was measured. Table 4 shows the obtained properties.

COMPARATIVE EXAMPLE 3

A liquid crystal panel was produced in the same manner as in Example 1 except that the second optical element was changed from the polymer film G to the polymer film L. Then, a contrast ratio in an oblique direction of a liquid crystal apparatus incorporating the liquid crystal panel was measured. Table 4 shows the obtained properties.

COMPARATIVE EXAMPLE 4

A liquid crystal panel was produced in the same manner as in Example 1 except that the second optical element was changed from the polymer film G to the polymer film M. Then, a contrast ratio in an oblique direction of a liquid crystal apparatus incorporating the liquid crystal panel was measured. Table 4 shows the obtained properties.

COMPARATIVE EXAMPLE 5

Figure 8:
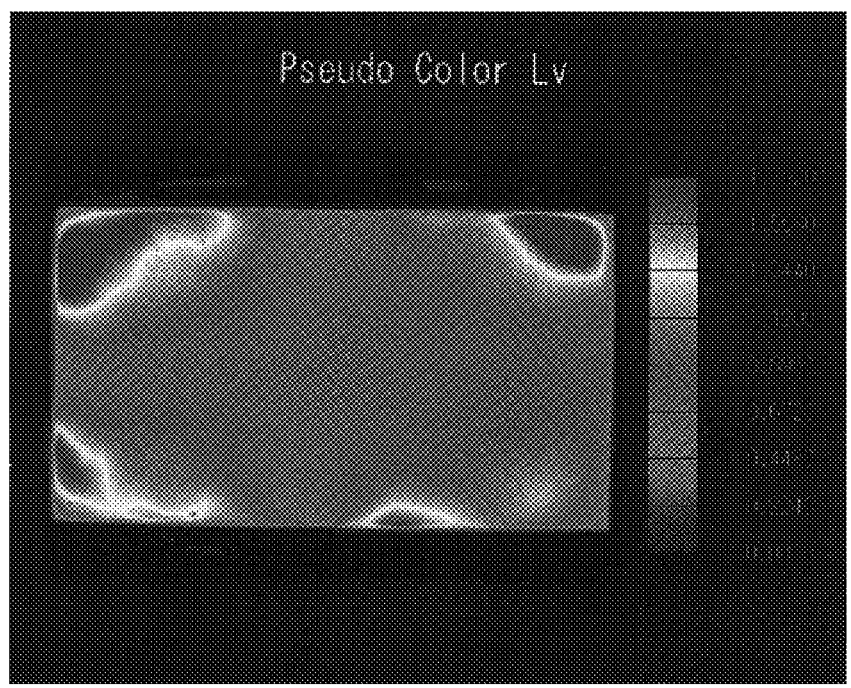
FIG. 8 is a photograph showing results of measurement of display unevenness of a liquid crystal cell according to Comparative Example 5.

A liquid crystal panel II was produced in the same manner as in Example 1 except that the first optical element was changed from the retardation film A to the retardation film F. The liquid crystal panel was incorporated into the original liquid crystal display apparatus, and backlight was turned on for 8 hours. Then, a display screen of the liquid crystal display apparatus was photographed in a dark room by using a two-dimensional color distribution measurement apparatus "CA-1500" (manufactured by Konica Minolta Holdings, Inc.). As shown in FIG. 8, there was large display unevenness due to heat of backlight to a great extent.

Evaluation

As shown in Examples 1 to 4, a liquid crystal display apparatus having a high contrast ratio in an oblique direction was obtained with the liquid crystal display apparatus including a second optical element having small retardation values and a first optical element having an Re[590] value within a range of 240 to 350 nm. Further, as shown in Examples 5 to 8, a liquid crystal display apparatus having a high contrast ratio in an oblique direction was obtained with the liquid crystal display apparatus including a second optical element having an Rth[590] value within a range of 0 to 20 nm. The liquid crystal display apparatus including the liquid crystal panel of Example 1 had very little display unevenness due to heat of backlight even when backlight was turned on for a long period of time. The liquid crystal display apparatus of each of Examples 2 to 8 had very little display unevenness, similar that of Example 1. However, Comparative Examples 1 to 4 each provided a liquid crystal display apparatus having a low contrast ratio in an oblique direction because the liquid crystal display apparatus included a first optical element and a second optical element each having retardation values out of the above ranges. As shown in Comparative Example 5, a liquid crystal display apparatus included a liquid crystal panel employing the retardation film with a large photoelastic coefficient obtained through a conventional technique, and thus had display unevenness due to heat of backlight to a great extent.

As described above, the liquid crystal panel of the present invention has enhanced contrast ratio in an oblique direction, and thus is very useful for improvement in display properties of the liquid crystal display apparatus. Therefore, the liquid crystal panel of the present invention may suitably be used for a liquid crystal display apparatus or a liquid crystal television.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel comprising:
   a liquid crystal cell comprising a liquid crystal layer containing homogeneously aligned nematic liquid crystals in the absence of an electric field;
   a polarizer arranged on both sides of the liquid crystal cell;
   a first optical element arranged between one polarizer and the liquid crystal cell; and
   a second optical element arranged between the other polarizer and the liquid crystal cell, wherein:
   the first optical element comprises a retardation film containing a styrene-based resin and a polycarbonate-based resin and satisfying the following expressions (1) and (2) and has a refractive index profile of nx>nz>ny; and
   the second optical element has substantially optical isotropy, $$240 \text{ nm} < Re[590] < 350 \text{ nm} \qquad (1)$$

$$0.20 < Rth[590]/Re[590] < 0.80 \qquad (2)$$

wherein the expressions (1) and (2), Re[590] and Rth[590] respectively represent in-plane retardation and thickness direction retardation values of the film measured by using light of a wavelength of 590 nm at 23° C.,
   wherein a content of the styrene-based resin in the retardation film is 10 to 40 parts by weight with respect to 100 parts by weight of a total solid content.

2. The liquid crystal panel according to claim 1, wherein the first optical element has a slow axis which is one of substantially parallel and substantially perpendicular to an absorption axis of one polarizer.

3. The liquid crystal panel according to claim 1, wherein an initial alignment direction of the liquid crystal cell is substantially parallel to a direction of an absorption axis of the polarizer on a side where the second optical element is arranged.

4. The liquid crystal panel according to claim 3, wherein the initial alignment direction of the liquid crystal cell is substantially parallel to a direction of an absorption axis of the polarizer arranged on a backlight side of the liquid crystal cell.

5. The liquid crystal panel according to claim 3, wherein the initial alignment direction of the liquid crystal cell is substantially perpendicular to a direction of an absorption axis of the polarizer arranged on a backlight side of the liquid crystal cell.

6. The liquid crystal panel according to claim 1, wherein the polycarbonate-based resin of the retardation film contains repeating units represented by the formulae (5) and (6)

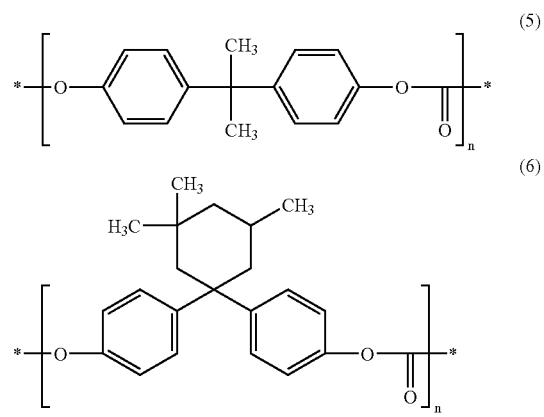

7. The liquid crystal panel according to claim 1, wherein the retardation film has an absolute value of photoelastic coefficient measured by using light of a wavelength of 590 nm at 23° C. of $2.0 \times 10^{-11}$ to $8.0 \times 10^{-11}$ m²/N.

8. The liquid crystal panel according to claim 1, wherein the second optical element comprises at least one polymer film selected from the group consisting of a cellulose-based resin, a norbornene-based resin, and a resin containing an alternating copolymer of isobutylene and N-methylmaleimide and an acrylonitrile/styrene copolymer.

9. The liquid crystal panel according to claim 1, wherein the second optical element comprises a laminate film prepared by laminating a negative C plate satisfying the following expressions (7) and (8), and a positive C plate satisfying the following expressions (9) and (10)

$$0 \text{ nm} < Re[590] \leq 10 \text{ nm} \qquad (7)$$

$$20 \text{ nm} < Rth[590] \leq 400 \text{ nm} \qquad (8)$$

$$0 \text{ nm} < Re[590] \leq 10 \text{ nm} \qquad (9)$$

$$-400 \text{ nm} \leq Rth[590] < -20 \text{ nm} \qquad (10)$$

wherein the expressions (7), (8), (9), and (10), Re[590] and Rth[590] respectively represent in-plane retardation and thickness direction retardation values of the film measured by using light of a wavelength of 590 nm at 23° C.

10. A liquid crystal television comprising the liquid crystal panel of claim 1.

11. A liquid crystal display apparatus comprising the liquid crystal panel of claim 1.

* * * * *